US007289161B2

(12) United States Patent
Yamakawa et al.

(10) Patent No.: US 7,289,161 B2
(45) Date of Patent: Oct. 30, 2007

(54) FRAME DATA COMPENSATION AMOUNT OUTPUT DEVICE, FRAME DATA COMPENSATION DEVICE, FRAME DATA DISPLAY DEVICE, AND FRAME DATA COMPENSATION AMOUNT OUTPUT METHOD, FRAME DATA COMPENSATION METHOD

(75) Inventors: Masaki Yamakawa, Tokyo (JP); Hideki Yoshii, Tokyo (JP); Noritaka Okuda, Tokyo (JP); Jun Someya, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 603 days.

(21) Appl. No.: 10/674,418

(22) Filed: Oct. 1, 2003

(65) Prior Publication Data

US 2004/0145596 A1 Jul. 29, 2004

(30) Foreign Application Priority Data

Jan. 24, 2003 (JP) ............................ 2003-016368

(51) Int. Cl.
*H04N 5/21* (2006.01)
*H04N 5/213* (2006.01)

(52) U.S. Cl. ...................... 348/607; 348/627; 348/620; 348/910; 348/226.1; 345/611

(58) Field of Classification Search ................ 348/607, 348/606, 620, 625, 627, 670, 671, 910, 226.1, 348/425.2; 345/89, 87, 88, 611; 382/272, 382/266

See application file for complete search history.

(56) References Cited

U.S. PATENT DOCUMENTS

| | | | | |
|---|---|---|---|---|
| 5,844,533 | A * | 12/1998 | Usui et al. | 345/89 |
| 6,724,398 | B2 * | 4/2004 | Someya et al. | 345/690 |
| 6,756,955 | B2 * | 6/2004 | Someya et al. | 345/88 |
| 6,825,824 | B2 * | 11/2004 | Lee | 345/89 |

(Continued)

FOREIGN PATENT DOCUMENTS

JP 04-204593 A 7/1992

(Continued)

*Primary Examiner*—David Ometz
*Assistant Examiner*—Jean W. Désir
(74) *Attorney, Agent, or Firm*—Birch, Stewart, Kolasch & Birch, LLP

(57) ABSTRACT

In the case where an input signal is an interlace signal such as NTSC signal, a flicker interference as aliasing interference brought about by the sampling theorem is contained in a region where a vertical frequency component is high. Accordingly, in the conventional processing in which rate of change in gradation is improved by making a drive voltage of liquid crystal at the time of change in gradation larger than normal liquid crystal drive voltage to increase response rate of the liquid crystal panel, interference component is also emphasized. As a result, quality level of a video picture to be displayed on the liquid crystal panel is deteriorated. The invention provides a compensation device capable of improving rate-of-change in gradation at a part where there is no flicker interference and changing rate-of-change in gradation to suppress the flicker at a part where there is any flicker interference.

19 Claims, 21 Drawing Sheets

U.S. PATENT DOCUMENTS

| | | | | |
|---|---|---|---|---|
| 7,164,439 | B2 * | 1/2007 | Yoshida et al. | 348/226.1 |
| 2001/0038372 | A1 | 11/2001 | Lee | |
| 2002/0030652 | A1 | 3/2002 | Shibata et al. | |
| 2002/0033813 | A1 | 3/2002 | Matsumura et al. | |
| 2002/0050965 | A1 | 5/2002 | Oda et al. | |

FOREIGN PATENT DOCUMENTS

| | | | |
|---|---|---|---|
| JP | 04-288589 | A | 10/1992 |
| JP | 06-189232 | A | 7/1994 |
| JP | 9-81083 | A | 3/1997 |

* cited by examiner

| | ① | ② | ③ | ④ | ⑤ | ⑥ |
|---|---|---|---|---|---|---|
| Ve | 1／2 | 1／2 | 1／2 | 3／4 | 3／4 | 3／4 |
| w | 0 | 0 | 1／4 | 1／4 | 1／4 | 3／8 |
| Ve′ | 1／2 | 1／2 | 3／4 | 1 | 1 | 9／8 |

FRAME DATA COMPENSATION AMOUNT OUTPUT DEVICE, FRAME DATA COMPENSATION DEVICE, FRAME DATA DISPLAY DEVICE, AND FRAME DATA COMPENSATION AMOUNT OUTPUT METHOD, FRAME DATA COMPENSATION METHOD

This nonprovisional application claims priority under 35 U.S.C. § 119(a) on Patent Application No. 2003-016368 filed in JAPAN on Jan. 24, 20036, which is herein incorporated by reference.

BACKGROUND OF THE INVENTION

1. Field of the Invention

The present invention relates to a matrix-type image display device such as liquid crystal panel and, more particularly, to a frame data compensation amount output device, a frame data compensation device, a frame data display device, a vertical edge detector and a vertical edge level signal output device for the purpose of improving rate-of-change of a gradation, and a frame data compensation output method, a frame data compensation method, a frame data display method, a vertical edge detection method and a vertical edge level output method.

2. Description of the Related Art

Prior Art 1.

In the conventional liquid crystal panel, an image memory that stores one frame of digital image data is provided. Further, a comparison circuit that compares levels of the above-mentioned digital image data and an image data to be read out one frame later from the above-mentioned image memory to output a change in gradation signal is also provided. In the case where this comparison circuit determines that levels of both of these comparison data are the same, the comparison circuit selects a normal liquid crystal drive voltage, and drives displaying electrode of a liquid crystal panel. On the contrary, in the case where the comparison circuit determines that levels of both of the above-mentioned comparison data are not the same, the comparison circuit selects a liquid crystal drive voltage higher than the above-mentioned normal liquid crystal drive voltage, and drives displaying electrode of a liquid crystal panel, as disclosed in, for example, the Japanese Patent Publication (unexamined) No. 189232/1994, at FIG. 2.

Prior Art 2.

In the conventional liquid crystal panel, in the case where an input signal is an interlace (interlaced scan) signal such as TV signal, a sequential scan conversion circuit that converts an interlace signal to a progressive (sequential scan) signal, is combined to carry out a further compensation of a drive voltage of the liquid crystal panel having been transformed larger than usual at the time of the change in gradation. Consequently, display performance on the liquid crystal panel at the time of inputting any interlace signal is improved, as disclosed in the Japanese Patent Publication (unexamined) No. 288589/1992, at FIGS. 16 and 15.

As shown in the above-mentioned Prior art 1, it is certainly possible to improve rate of change in gradation by increasing response rate of the liquid crystal panel. Such increase in response rate can be achieved by making a drive voltage of the liquid crystal at the time of change in gradation larger than normal liquid crystal drive voltage.

However, in the case where input signal is an interlace signal, for example, NTSC signal, a flicker interference (flickering) as aliasing interference brought about by the sampling theorem is contained in a region where a vertical frequency component is high. Moreover, this interference component is an interference the gradation of which varies every frame. Accordingly, since this interference component is also emphasized by a signal processing as shown in the above-mentioned prior art 1, a problem exists in that quality level of a video picture to be displayed on the liquid crystal panel is deteriorated.

In the above-mentioned prior art 2, in the case where input signal is an interlace (interlaced scan) signal such as TV signal, a sequential scan conversion circuit that converts the interlace signal to a progressive (sequential scan) signal, is incorporated. Then, a drive voltage of the liquid crystal panel having been transformed to be larger than usual at the time of change in gradation is further compensated thereby improving a display performance on the liquid crystal panel when an interlace signal is inputted. In addition, a drive voltage of the liquid crystal at the time of change in gradation is made larger than a normal drive voltage. Thus, the rate-of-change in gradation is improved by speeding up a response rate of the liquid crystal.

However, in the above-mentioned prior art 2, since it becomes necessary to be provided with various circuits such as frame memory accompanied by the addition of a sequential scan conversion circuit, a problem exists in that a circuit scale constituting the device grows in size as compared with the prior art 1.

Furthermore, an input signal is limited to the case of an interlace signal in the above-mentioned prior art 2. Thus, another problem exits in that, in the case of outputting a signal (progressive signal) after having processed an input interlace signal in which an interference component such as flicker interference remains contained as is a home computer provided with, e.g., TV tuner, it is impossible to effectively cope with the case.

SUMMARY OF THE INVENTION

Accordingly, a first object of the present invention is to obtain a frame data compensation amount output device and a frame data compensation amount output method, which are capable of outputting a compensation amount in order to compensate a liquid crystal drive signal thereby improving rate-of-change in gradation at apart where there is no flicker interference in an image to be displayed (hereinafter, the image is also referred to as “frame”); and outputting a compensation amount in order to compensate a liquid crystal drive signal depending on degrees of this flicker interference at apart where there is any flicker interference, for the purpose of improving response rate of the liquid crystal as well as displaying the frame less influenced by the flicker interference in an image display device employing, e.g., liquid crystal panel.

A second object of the invention is to obtain a frame data compensation device or a frame data compensation method, which is capable of adjusting mentioned gradation rate-of-change by compensating a liquid crystal drive signal with a compensation amount outputted from mentioned frame data compensation amount output device or by the mentioned frame data compensation amount output method.

A third object of the invention is to obtain a frame data compensation device or a frame data compensation method, which is capable of adjusting a gradation rate-of-change of a liquid crystal even in the case where capacity of a frame memory is reduced.

A fourth object of the invention is to obtain a frame data display device and a frame data display method, which are capable of displaying an image less influenced by the flicker interference on the mentioned liquid crystal panel based on a liquid crystal drive signal having been compensated by the mentioned frame data compensation device or the mentioned frame data compensation method.

A frame data compensation amount output device according to this invention takes one frame for a target frame out of frames contained in an image signal to be inputted. The frame data compensation amount output device comprises: first compensation amount output means for outputting a first compensation amount to compensate data corresponding to the mentioned target frame based on the data corresponding to the mentioned target frame and the data corresponding to a frame before the mentioned target frame by one frame (i.e., a frame which is one frame previous to the mentioned target frame); and second compensation amount output means for outputting a second compensation amount to compensate a specific data detected based on the data corresponding to the mentioned target frame and the data corresponding to a frame before the mentioned target frame by one frame. The frame data compensation amount output device outputs any of the mentioned first compensation amount, the mentioned second compensation amount, and a third compensation amount that is generated based on the mentioned first compensation amount and the mentioned second compensation amount and compensates data corresponding to the mentioned target frame.

As a result, it becomes possible to display a less-deteriorated target frame by the display means, as well as to make a response rate in the display means faster.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiment 1

Figure 1:
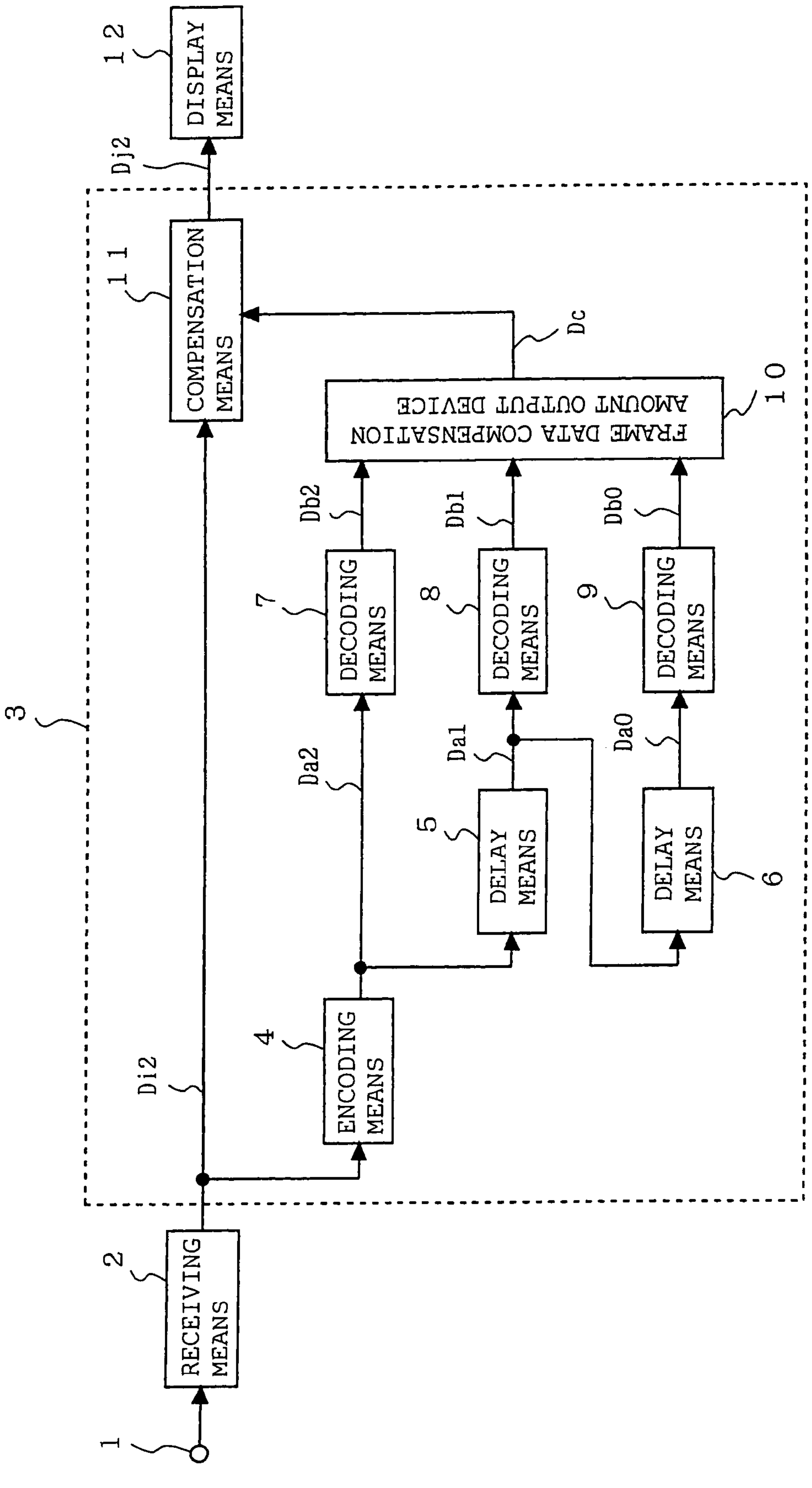
FIG. 1 is a diagram showing a constitution of an image display device according to a first preferred embodiment.

FIG. 1 is a block diagram showing a constitution of an image display device according to a first preferred embodiment. In the image display device according to this first embodiment, an image signal is inputted to an input terminal 1.

The image signal having been inputted to the input terminal 1 is received by receiving means 2. Then, the image signal having been received by the receiving means 2 is outputted to a frame data compensation device 3 as frame data Di2 of a digital format (hereinafter, this frame data are also referred to as image data). Herein, the mentioned frame data Di2 stand for data that corresponding to, e.g., number of gradations and chrominance differential signal of a frame that are included in an image signal to be inputted. Further, the mentioned frame data Di2 are the frame data corresponding to a frame targeted (hereinafter, referred to as target frame) to be compensated by the frame data compensation device 3 out of the frames included in the inputted image signal. Now, in this first embodiment, the case of compensating a frame data Di2 corresponding to a number of gradations of the mentioned target frame is hereinafter described.

A frame data Di2 having been outputted from the receiving means 2 are compensated through the frame data compensation device 3, and outputted to display means 12 as frame data Dj2 having been compensated.

The display means 12 displays the compensated target frame based on a frame data Dj2 having been outputted from the frame data compensation device 3.

Operations of the frame data compensation device 3 according to the first embodiment are hereinafter described.

A frame data Di2 having been outputted from the receiving means 2 are first encoded by encoding means 4 in the frame data compensation device 3 whereby data capacity of the frame data Di2 is compressed.

Then, the encoding means 4 outputs a first encoded data Da2, which are obtained by encoding the mentioned frame data Di2, to first delay means 5 and a first decoding means 7. Herein, as an encoding method of a frame data Di2 at the encoding means 4, any encoding method for a still image, for example, a 2-dimensional discrete cosine transform encoding method such as JPEG, a block encoding method such as FBT or GBTC, a prediction encoding method such as JPEG-LS, and a wavelet transform method such as JPEG2000, can be employed. As the above-mentioned encoding method for the still image, either a reversible (lossless) encoding method in which an image data before encoding and a decoded image data are completely coincident or a non-reversible (lossy) encoding method in which both of them are not coincident can be employed. Further, either variable length encoding method in which amount of encoding varies depending on image data or a fixed-length encoding method in which amount of encoding is constant can be employed.

The first delay means 5, which has received the first encoded data Da2 having been outputted from the encoding means 4, outputs to a second delay means 6 second encoded data Da1 corresponding to a frame before the frame corresponding to the mentioned first encoded data Da2 by one frame. Moreover, the mentioned second encoded data Da1 are outputted to a second decoding means 8 as well.

Furthermore, first decoding means 7, which receives the first encoded data Da2 having been outputted from the encoding means 4, outputs to a frame data compensation amount output device 10 a first decoded data Db2 that can be obtained by decoding the mentioned first encoded data Da2.

A second delay means 6, which receives the second encoded data Da1 having been outputted from the first delay means 5, outputs to a third decoding means 9 third encoded data Da0 corresponding to a frame before the frame corresponding to mentioned second encoded data Da1 by one frame, that is, corresponding to the frame before the mentioned target frame by two frames.

Besides, second decoding means 8, which receives the second encoded data Da1 having been outputted from the first delay means 5, outputs to the frame data compensation amount output device 10 a second decoded data Db1 that can be obtained by decoding the mentioned second encoded data Da1.

The third decoding means 9, which receives the third encoded data Da0 having been outputted from the second delay means 6, outputs to the frame data compensation amount output device 10 third decoded data Db0 that can be obtained by decoding the mentioned third encoded data Da0.

The frame data compensation amount output device 10, which receives the first decoded data Db2 having been outputted from the first decoding means 7, the second decoded data Db1 having been outputted from the second decoding means 8 and the third decoded data Db0 having been outputted from the third decoding means 9, outputs to compensation means 11 a compensation amount Dc to compensate frame data Di2 corresponding to an target frame.

The compensation means 11 having received a compensation amount Dc compensates the mentioned frame data Di2 based on this compensation amount Dc, and outputs to the display means 12 frame data Dj2 that can be obtained by this compensation.

Furthermore, a compensation amount Dc is set to be such a compensation amount as enables to carry out compensation so that a gradation of an target frame to be displayed based on mentioned frame data Dj2 maybe within a range of gradations capable of being displayed by the display means 12. Accordingly, for example, in the case where the display means can display a gradation of up to 8 bits, a compensation amount is set to be the one enabling the compensation so that a gradation of a target frame to be displayed based on the mentioned frame data Dj2 may be in a range of from 0 to 255 gradations.

In addition, in the frame data compensation device 3, it is certainly possible to carry out compensation of a frame data Di2 even if the mentioned encoding means 4, mentioned first decoding means 7, mentioned second decoding means 8, and mentioned third decoding means 9 are not provided. However, a data capacity of the frame data can be made smaller by providing the mentioned encoding means 4. Thus it becomes possible to eliminate recording means comprising a semiconductor memory, a magnetic disc or the like that constitutes the first delay means 5 or the second delay means 6, thereby enabling to make a circuit scale smaller as the whole device. Further, by making an encoding factor (data compressibility) higher, it is possible to make smaller capacity of, e.g., memory necessary for delaying the mentioned first encoded data Da2 and the mentioned second encoded data Da1 in the mentioned first delay means 5 and the mentioned second delay means 6.

Furthermore, due to the fact that there are provided the decoding means (first decoding means, second decoding means and third decoding means), which decode the encoded data (first encoded data Da2, second encoded data Da1 and third encoded data Db0), it comes to be possible to eliminate influence due to any error generated by encoding and compression.

Now, the frame data compensation amount output device 10 according to the first embodiment is described.

Figure 2:
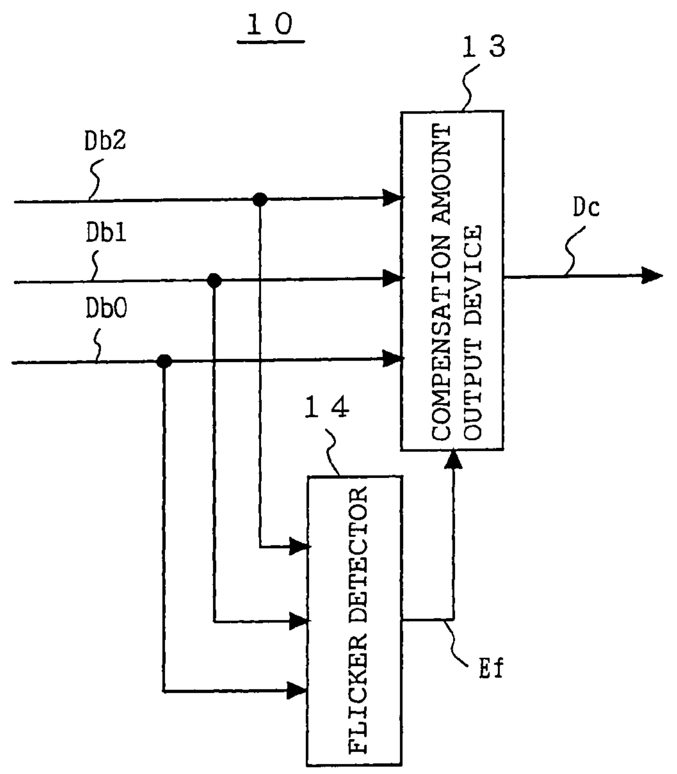
FIG. 2 is a diagram showing a constitution of a frame data compensation amount output device according to the first embodiment.

FIG. 2 is an example of an internal constitution of the frame data compensation amount output device 10 of FIG. 1.

With reference to FIG. 2, the first decoded data Db2, second decoded data Db1 and third decoded data Db0, which have been outputted from the first decoding means 7, second decoding means 8 and third decoding means 9 respectively, are inputted to each of a compensation amount output device 13 and a flicker detector 14.

The flicker detector 14 outputs a flicker detection signal Ef to the compensation amount output device 13 in accordance with data corresponding to a flicker component in the data corresponding to a target frame from the mentioned first decoded data Db2, second decoded data Db1 and third decoded data db0.

The compensation amount output device 13 outputs a compensation amount Dc to compensate frame data Di2 based on the mentioned first decoded data Db2, second decoded data Db1 and third decoded data db0, as well as the mentioned flicker detection signal Ef.

The compensation amount output device 13 outputs, as a compensation amount Dc, a compensation amount causing the rate-of-change in gradation to improve (hereinafter, a compensation amount causing the rate-of-change in gradation to improve is referred to as gradation rate-of-change compensation amount, or first compensation amount as well.) in the case where frame data Di2 corresponding to an target frame contain no component equivalent to a flicker interference (hereinafter, it is also referred to as a flicker component); a compensation amount to compensate a component equivalent to this flicker interference (hereinafter, a compensation amount to compensate a component equivalent to the flicker interference is referred to as flicker suppression compensation amount, or second compensation amount as well.) in the case of containing a component equivalent to the flicker interference; or a third compensation amount generated based on the mentioned first compensation amount and the mentioned second compensation amount.

Figure 3:
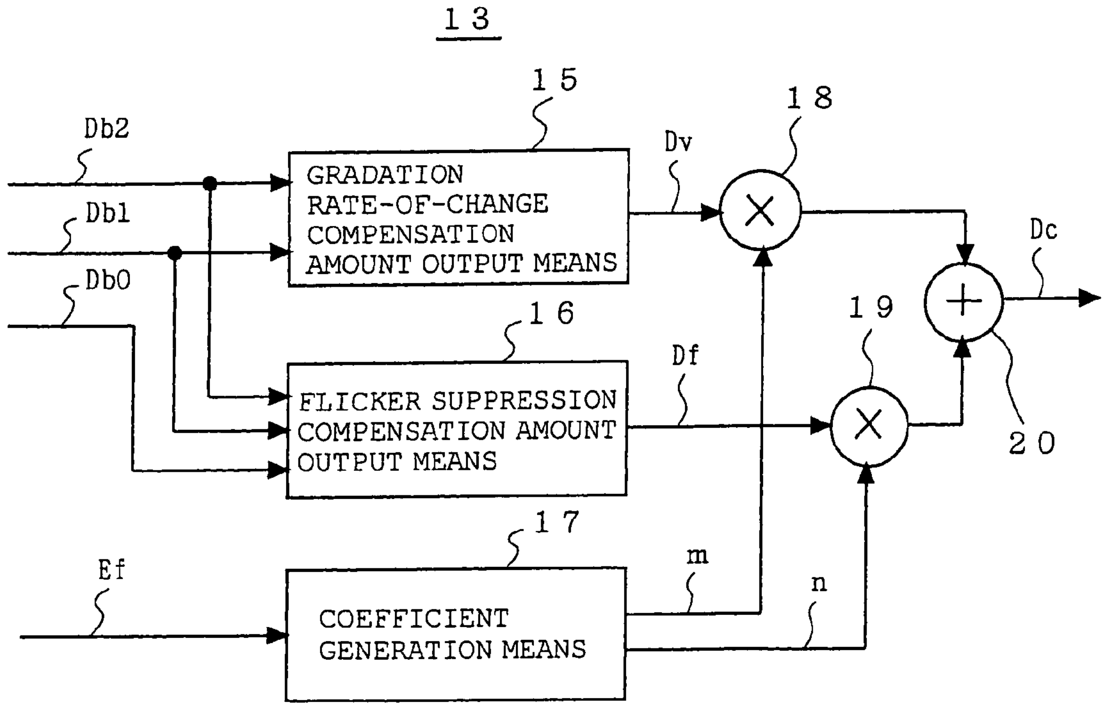
FIG. 3 is a diagram showing a constitution of a compensation amount output device according to the first embodiment.

FIG. 3 shows an example of an internal constitution of the compensation amount output device 13 of FIG. 2.

Figure 4:
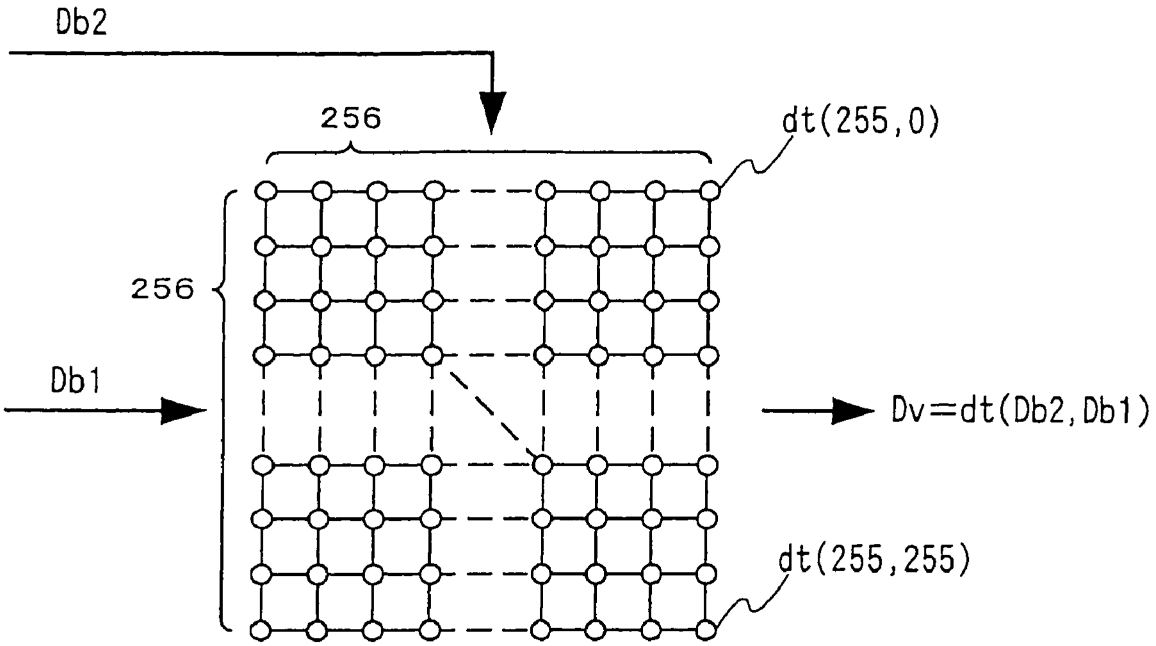
FIG. 4 is a chart showing input/output data of gradation rate-of-change compensation amount output means according to the first embodiment.

With reference to FIG. 3, gradation rate-of-change compensation amount output means 15 (hereinafter, the gradation rate-of-change compensation amount output means 15 is also referred to as first compensation amount output means) is provided with a lookup table as shown in FIG. 4 that consists of gradation rate-of-change compensation amounts Dv to compensate number of gradations of the frame data Di2. Then, the gradation rate-of-change compensation amount output means 15 outputs to a first coefficient unit 18 the mentioned gradation rate-of-change compensation amount Dv from the lookup table based on the mentioned first decoded data Db2 and the mentioned second decoded data Db1.

Flicker suppression compensation amount output means 16 (hereinafter, the flicker suppression compensation amount output means 16 is also referred to as second compensation amount output means) outputs to a second coefficient unit 19 a flicker suppression compensation amount Df to compensate frame data Di2 containing data corresponding to a flicker interference based on the first decoded data Db2, second decoded data Db1 and third decoded data Db0.

Coefficient generation means 17 outputs a first coefficient m, by which a gradation rate-of-change compensation amount Dv is multiplied, and a second coefficient n, by which a flicker suppression compensation amount Df is multiplied, to the first coefficient unit 18 and the second coefficient unit 19 respectively in accordance with a flicker detection signal Ef having been outputted from the flicker detector 14.

The mentioned first coefficient unit 18 and second coefficient unit 19 multiply a gradation rate-of-change compensation amount Dv and flicker suppression compensation amount Df respectively by the mentioned first coefficient m and the mentioned second coefficient n having been outputted from the coefficient generation means 17. Then, (m*Dv) (* is a multiplication sign and further description is omitted), and (n*Df) are outputted to an adder 20 from the first coefficient unit 18 and from the second coefficient unit 19 respectively.

The adder 20 adds (m*Dv) having been outputted from the mentioned first coefficient unit 18 and (n*Df) having been outputted from the mentioned second coefficient unit 19, and outputs a compensation amount Dc.

FIG. 4 shows a constitution of the mentioned lookup table, and is an example in the case where mentioned respective first decoded data Db1 and mentioned second decoded data Db2 are of 8 bits (256 gradations).

Number of compensation amounts of rate-of-change in gradation forming the mentioned lookup table is determined based on number of gradations capable of being displayed by the display means 12.

For example, in the case where number of gradations, which the display means can display, is 4 bits, the mentioned lookup table is formed of (16*16) numbers of gradation rate-of-change compensation amounts Dv. Further in the case of being 10 bits, the mentioned lookup table is formed of (1024*1024) numbers of gradation rate-of-change compensation amounts Dv.

Thus, in the case of 8 bits as shown in FIG. 4, number of gradations, which the display means can display, is 256 gradations, and therefore the lookup table is formed of (256*256) numbers of gradation rate-of-change compensation amounts.

Further, in the case where number of gradations of a target frame increases over that of the frame before the mentioned target frame by one frame when the display means 12 displays the target frame, a gradation rate-of-change compensation amount Dv is a compensation amount that compensates data corresponding to number of gradations higher than that of the mentioned target frame out of the frame data Di2 corresponding to the mentioned target frame. Whereas, in the case where number of gradations of the mentioned target frame decreases under that of the frame before the mentioned target frame by one frame, the gradation rate-of-change compensation amount Dv is a compensation amount to compensate data corresponding to number of gradations lower than that of the mentioned target frame out of the frame data Di2 corresponding to the mentioned target frame.

In addition, in the case where there is no change between number of gradations of the mentioned target frame and that of the frame before the mentioned target frame by one frame, the mentioned gradation rate-of-change compensation amount Dv is 0.

Figure 5:
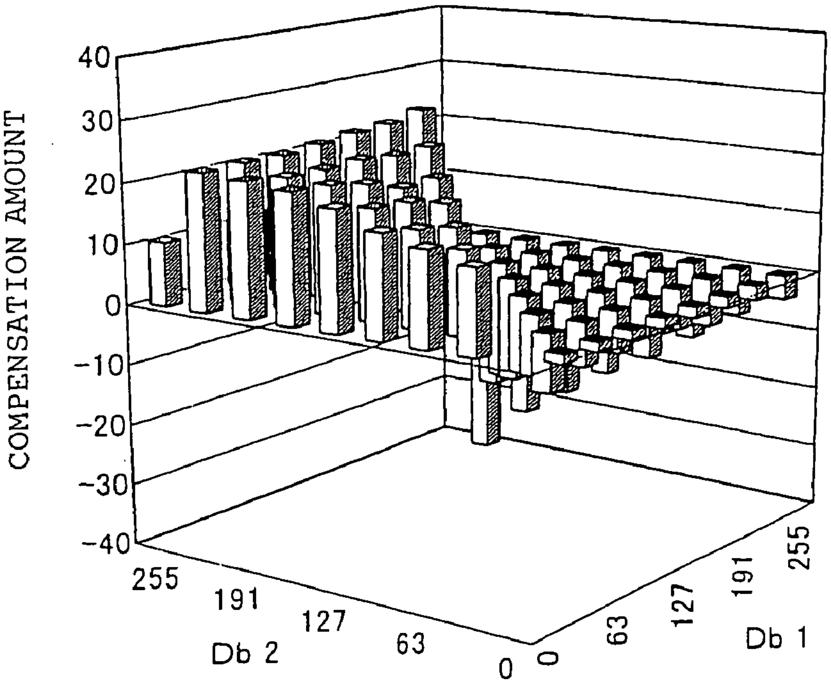
FIG. 5 is a chart showing relation of compensation amounts within a lookup table according to the first embodiment.

Moreover, in mentioned lookup table, a gradation rate-of-change compensation amount Dv responsive to the case where the change from number of gradations of the frame before the target frame by one frame to number of gradations of the target frame is a slow change, is set to be larger. For example, in the liquid crystal panel, response rate at the time of changing from an intermediate gradation (gray) to a high gradation (white) is slow. Accordingly, the gradation rate-of-change compensation amount Dv that is outputted based on decoded data Db1 corresponding to an intermediate gradation and decoded data Db2 corresponding to a high gradation is set to be larger. Thus, magnitudes of a gradation rate-of-change compensation amount Dv in mentioned lookup table are typically shown as in FIG. 5, thereby enabling to effectively improve the rate-of-change in gradation at the mentioned display means 12.

Figure 6:
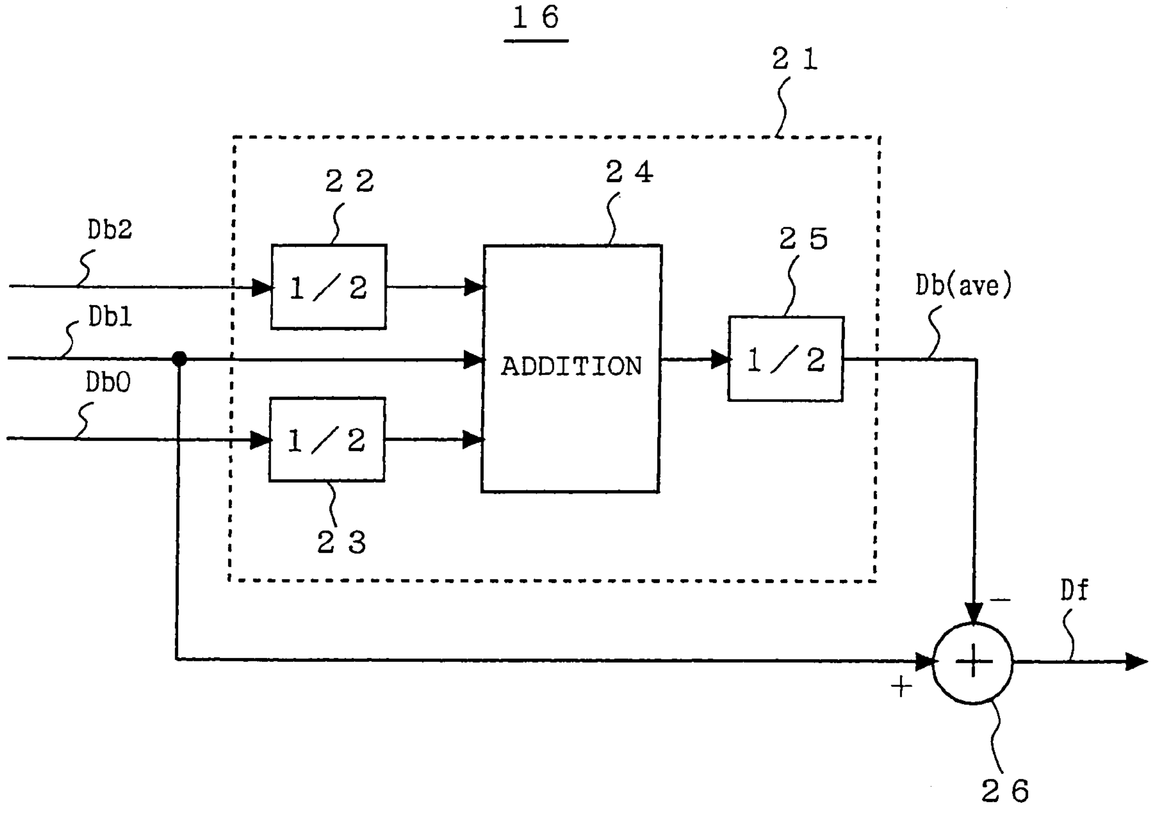
FIG. 6 is a diagram showing a part of an internal constitution of flicker suppression compensation amount output means according to the first embodiment.

FIG. 6 is an example of an internal constitution of the flicker suppression compensation amount output means 16 of FIG. 3.

The Mentioned first decoded data Db2 and the third decoded data Db0 are inputted to a first ½ coefficient unit 22 and a second ½ coefficient unit 23 respectively. Then, the mentioned first decoded data Db2 and mentioned third decoded data Db0 are brought into data of ½ size respectively to be output to an adder 24. Further, the mentioned second decoded data Db1 are outputted to the adder 24 as they are.

The adder 24 adds the mentioned decoded data Db1, and the mentioned first decoded data Db2 and third decoded data Db0, which have been outputted from the first ½ coefficient unit 22 and second ½ coefficient unit 23, and outputs a result obtained by such addition (½*Db2+Db1+½*Db0) to a third ½coefficient unit 25.

An addition result having been outputted from the adder 24 is brought into the data of ½ size (½*(½*Db2+Db1+ ½*Db0) ) by means of the mentioned third ½ coefficient unit 25, and outputted to a subtracter 26. Hereinafter, data to be outputted from the subtracter 26 are referred to as average gradation data (ave).

Figure 7:
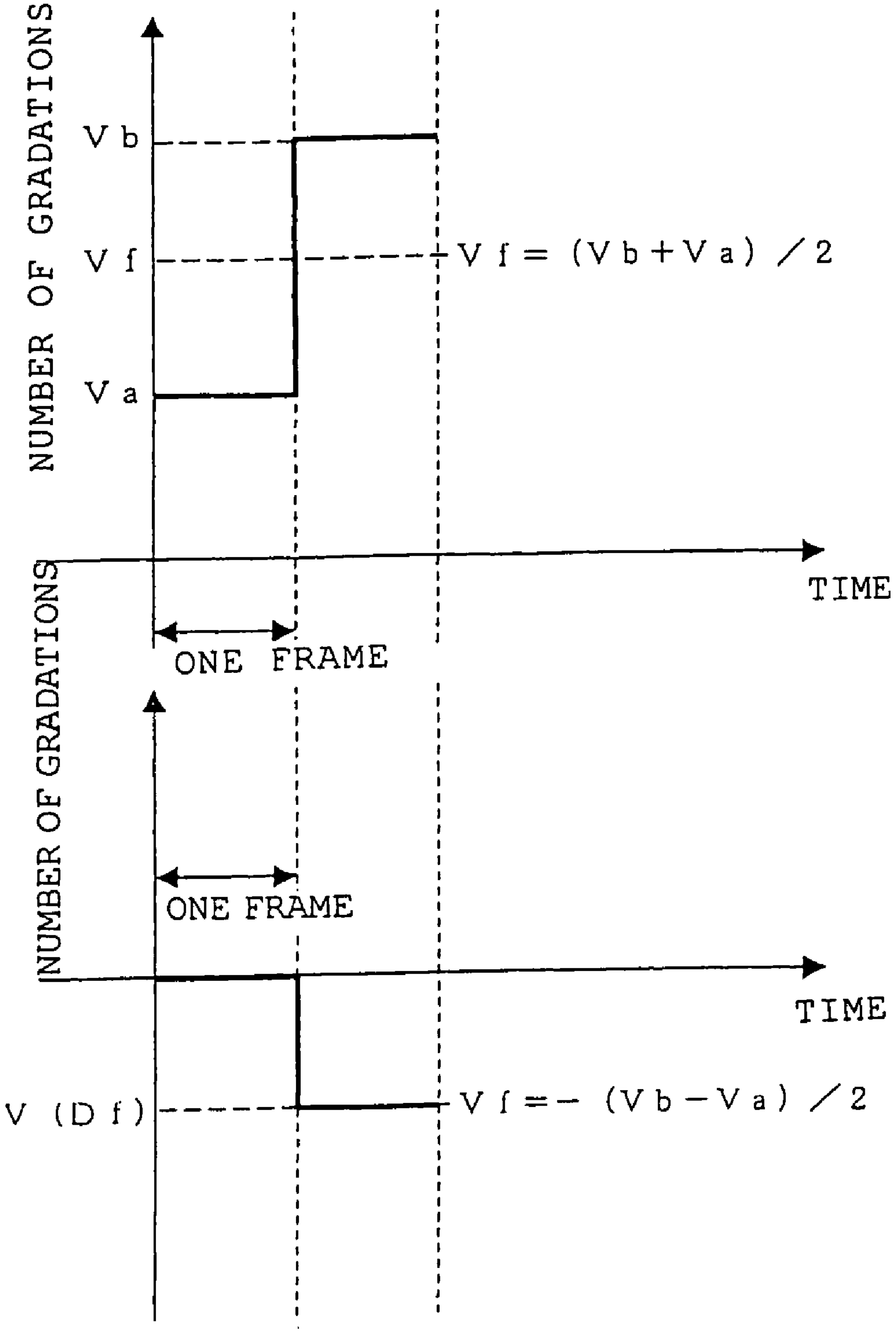
FIG. 7 is a chart for explaining average gradation at a flicker part.

In the case where the flicker interference occurs at the time of displaying a target frame by the display means 12, the mentioned average gradation data Db (ave) correspond to an average gradation Vf of the flicker part, which is now described referring to FIG. 7.

With reference to FIG. 7, Vb denotes number of gradations of a target frame, and Va denotes number of gradations of the frame before the mentioned target frame by one frame. Number of gradations of the frame before the mentioned target frame by two frames is the same Vb as that of the target frame. Herein, an average Vf of number of gradations at the flicker part is, $$Vf=Vb-(Vb-Va)/2=(Vb+Va)/2.$$

Based on these conditions, number of gradations V (ave) corresponding to an average gradation data Db (ave) is obtained as follows.

$$\begin{aligned} V(ave) &= 1/2*(Vb/2+Va+Vb/2) \\ &= (Vb+Va)/2 = Vf \end{aligned}$$

Thus, the average Vf of number of gradations at the flicker part and number of gradations V (ave) corresponding to average gradation data Db (ave) are coincident to each other.

The subtractor 26 subtracts the mentioned average gradation data Db (ave) from the mentioned second decoded data Db1, thereby generating a flicker suppression compensation amount Df, and outputs this flicker suppression compensation amount Df to the second coefficient unit 19.

Herein, generation of the mentioned flicker suppression compensation amount Df is described again with reference to FIG. 7. As described above, number of gradation V (ave) corresponding to the average gradation data Db (ave) is, $$V(\text{ave})=(Vb+Va)/2=Vf.$$

Then, subtraction is carried out at the subtracter 26, and a flicker suppression compensation amount Df corresponding to number of gradations V (Df) as shown below is generated.

$$\begin{aligned} V(Df) &= Va - V(ave) \\ &= Va-(Vb+Va)/2 \\ &= -(Vb-Va)/2 \end{aligned}$$

Figure 8A:
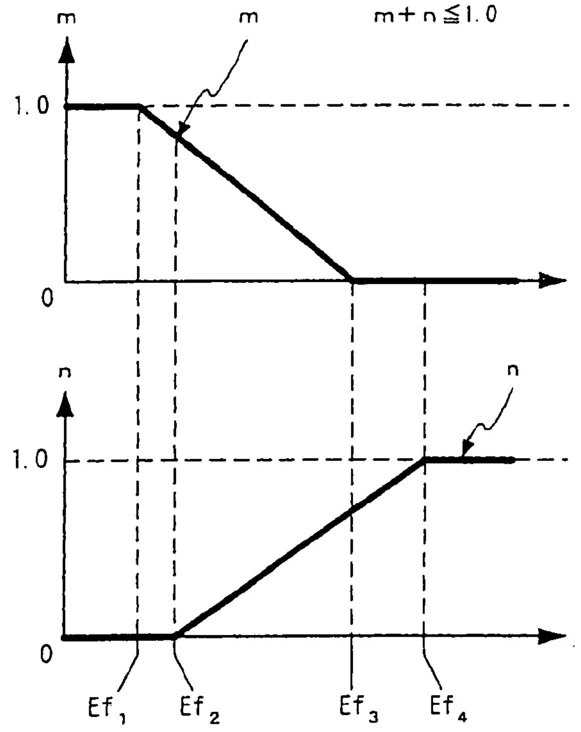
FIGS. 8(*a*) and (*b*) are charts each for explaining operations of coefficient generation means according to the first embodiment.
Figure 8B:
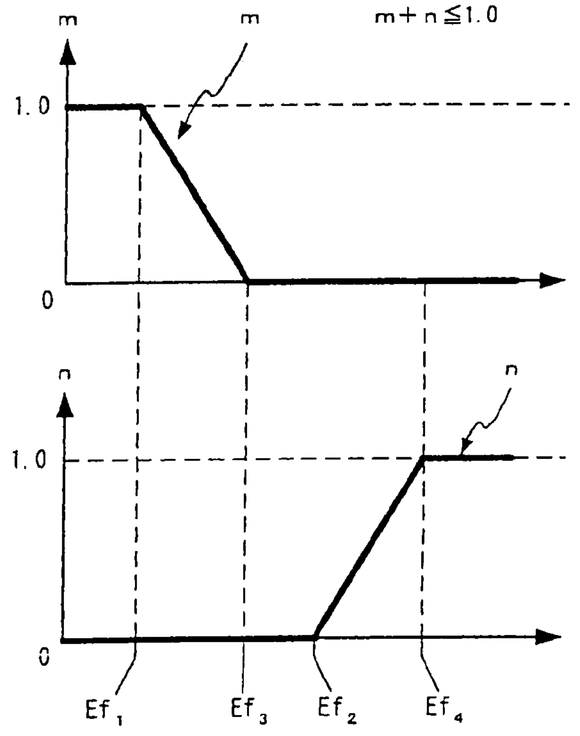

Values of the first coefficient m and second coefficient n to be outputted from the coefficient generation means 17 are determined in accordance with a flicker detection signal as shown in FIGS. 8(*a*) and (*b*). Hereinafter, operations of the coefficient generation means 17 are described referring to FIG. 8(*a*).

In the case where level of a flicker detection signal Ef is not more than Ef1 (0≦Ef≦Ef1), specifically, in the case where a component equivalent to a flicker interference is not contained in a frame data Di2, or in the case where this component equivalent to the flicker gives no influence on image quality of a target frame to be displayed by the display means 12 even if the component equivalent to the mentioned flicker interference is contained, the first coefficient m and the second coefficient n are outputted so that only a gradation rate-of-change compensation amount Dv may be a compensation amount Dc. Accordingly, m=1 and n=0 are outputted from the coefficient generation means 17.

In the case where level of a flicker detection signal Ef is not less than Ef4 (Ef4≦Ef), more specifically, in the case where a component equivalent to a flicker interference is contained in a frame data Di2, as well as this component equivalent to the flicker interference assuredly becomes the flicker interference in a target frame to be displayed by the display means, the first coefficient m and the second coefficient n are outputted so that only a flicker suppression compensation amount Df may be the compensation amount Dc. Accordingly, m=0 and n=1 are outputted from the coefficient generation means 17.

In the case where level of a flicker detection signal Ef is larger than Ef1 and smaller than Ef4 (Ef1<Ef<Ef4), the first coefficient m and the second coefficient n are outputted so that a third compensation amount to be generated based on a gradation rate-of-change compensation amount Dv and a flicker suppression compensation amount Df may be the compensation amount Dc. Accordingly, the first coefficient m and second coefficient n meeting the conditions of $$0<m<1 \text{ and } 0<n<1$$

are outputted from the coefficient generation means 17.

Furthermore, the mentioned first coefficient m and the mentioned second coefficient n are set so as to satisfy the condition of m+n≦1. In case of not satisfying this condition, it is possible that a frame data Dj2, which is obtained by compensating a frame data Di2 with a compensation amount Dc to be outputted from the frame data compensation amount output device 10, contains data corresponding to number of gradations exceeding that capable of being displayed by the display means. That is, such a problem occurs that a target frame cannot be displayed even if the mentioned target frame is intended to be displayed by the display means based on the mentioned frame data Dj2

In addition, although the change of the first coefficient m and the second coefficient n are shown with a straight line in FIGS. 8(*a*) and (*b*), it is also preferable the coefficients are shown, e.g., by a curved line in case of a monotonic change.

Further, even in this case, it is a matter of course that the mentioned first coefficient m and mentioned second coefficient n are set so as to satisfy mentioned condition, i.e., m+n≦1.

Furthermore, although the above-mentioned descriptions are about the case of setting the first coefficient m and the second coefficient n as shown in FIG. 8(*a*), it is also possible to set the mentioned first coefficient m and the mentioned second coefficient n arbitrarily if only they satisfy the mentioned condition of m+n≦1. FIG. 8(*b*) is another example of setting the first coefficient m and the second coefficient n. In this example, in the case where a flicker detection signal Ef is in a zone of from Ef3 to Ef2, an outputted compensation amount Dc is 0. Further, in the case where the mentioned flicker detection signal Ef is smaller than Ef3, only the gradation rate-of-change compensation amount Dv is outputted as a compensation amount Dc; while only the flicker suppression compensation amount Df is outputted as a compensation amount Dc in the case where the mentioned flicker detection signal Ef is larger than Ef2.

Figure 9A:
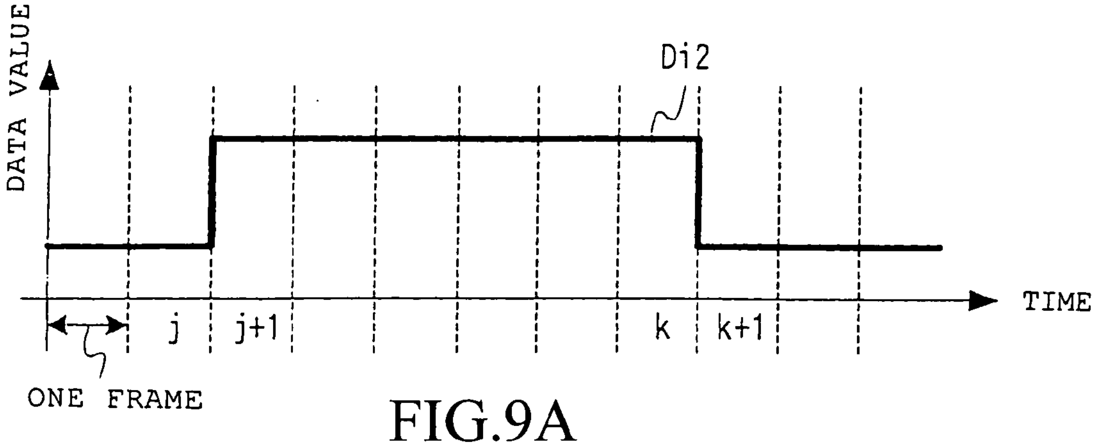
FIGS. 9(*a*), (*b*) and (*c*) are charts each showing change in gradation characteristic of a display image in the case where a first coefficient m=1 and a second coefficient n=0 in the first embodiment.
Figure 9B:
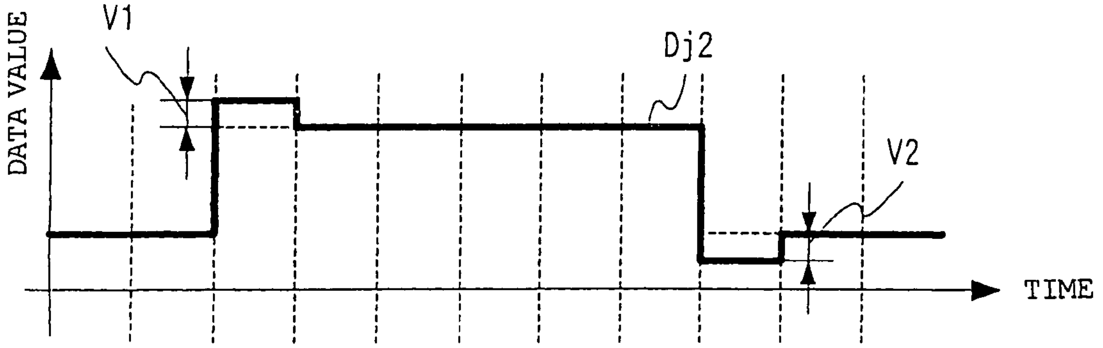
Figure 9C:
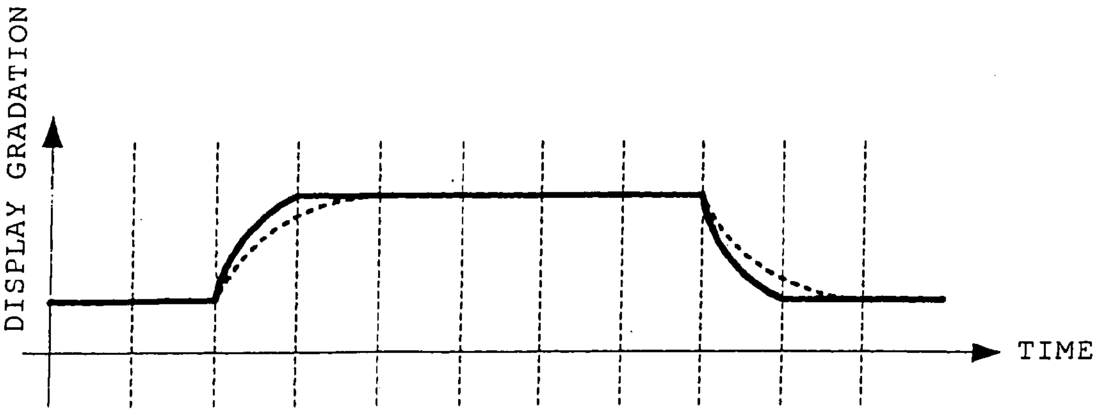
Figure 10A:
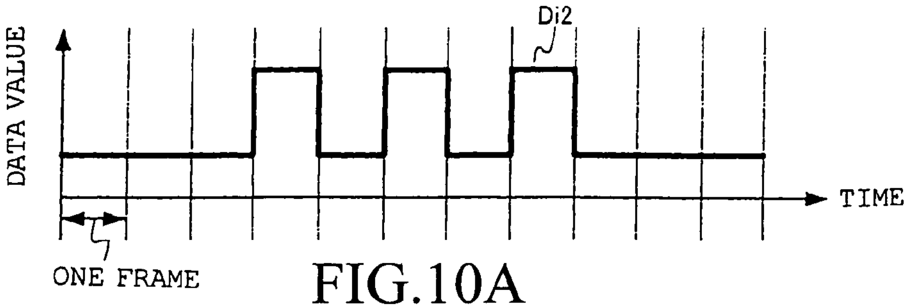
FIGS. 10(*a*), (*b*), (*c*), (*d*) and (*e*) are charts each showing change in gradation characteristic of a display image in the case where the first coefficient m=0, and the second coefficient n=1 in the first embodiment.
Figure 10B:
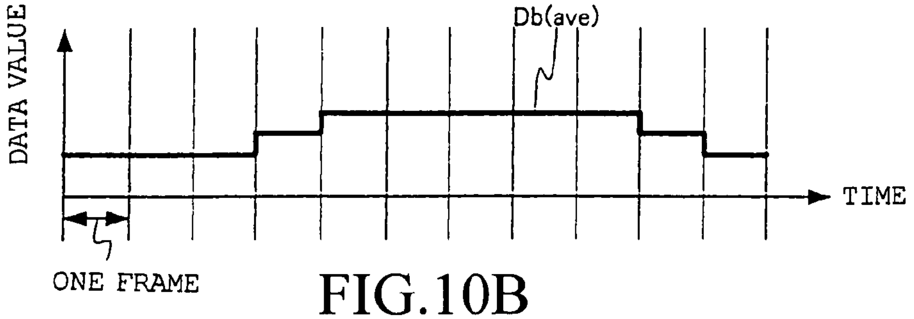
Figure 10C:
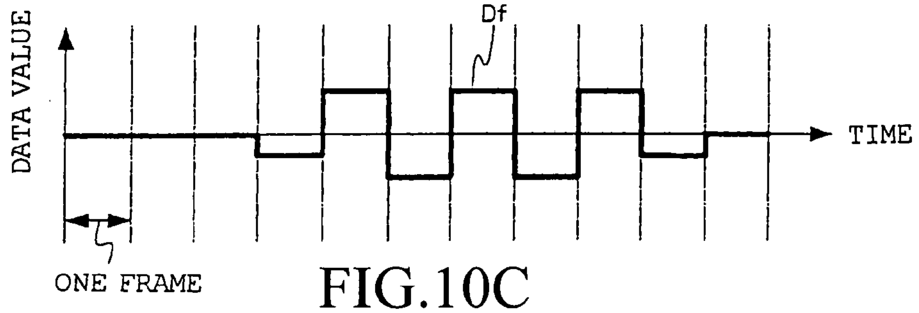
Figure 10D:
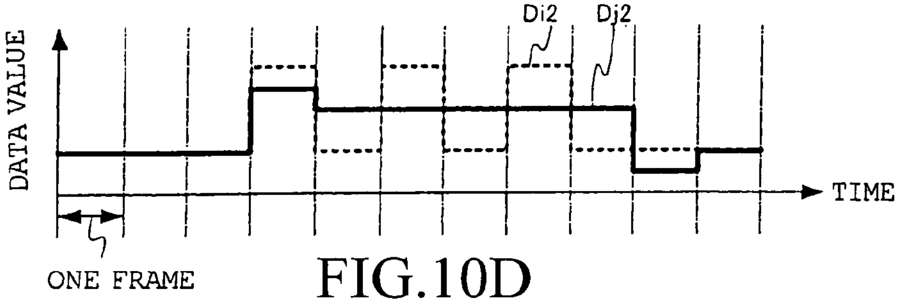
Figure 10E:
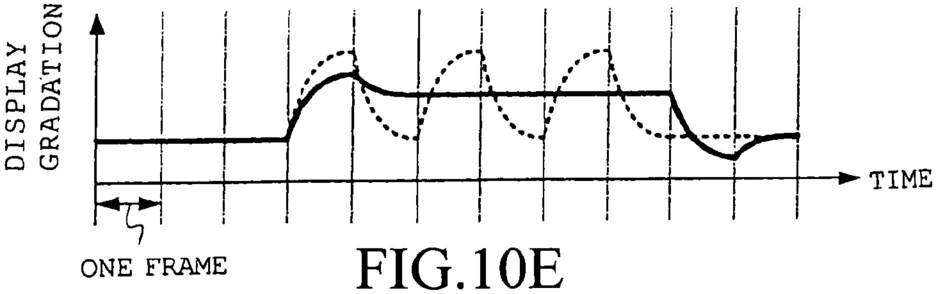
Figure 11A:
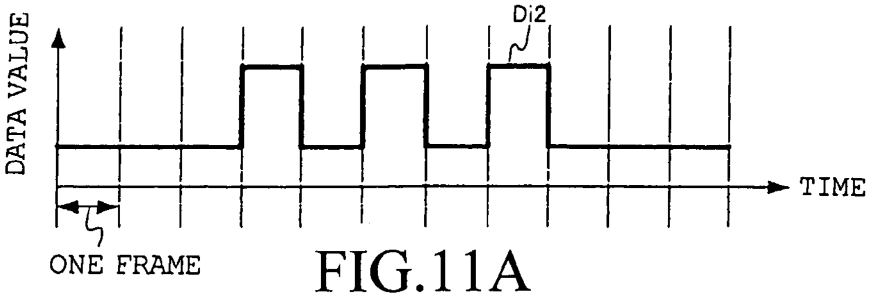
FIGS. 11(*a*), (*b*), (*c*), (*d*) and (*e*) are charts each showing change in gradation characteristic of a display image in the case where the first coefficient m=0.5, and the second coefficient n=0.5 in the first embodiment.
Figure 11B:
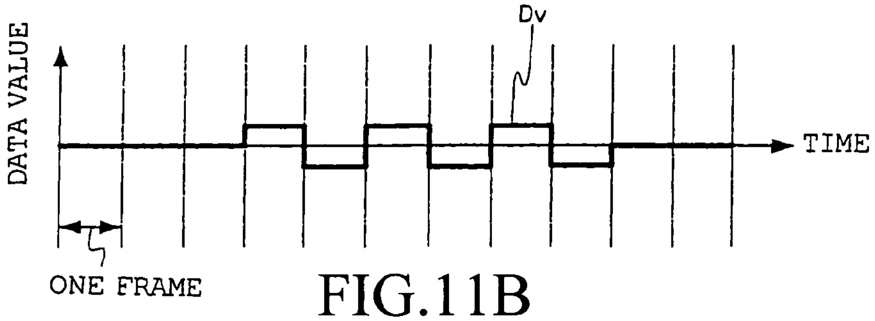
Figure 11C:
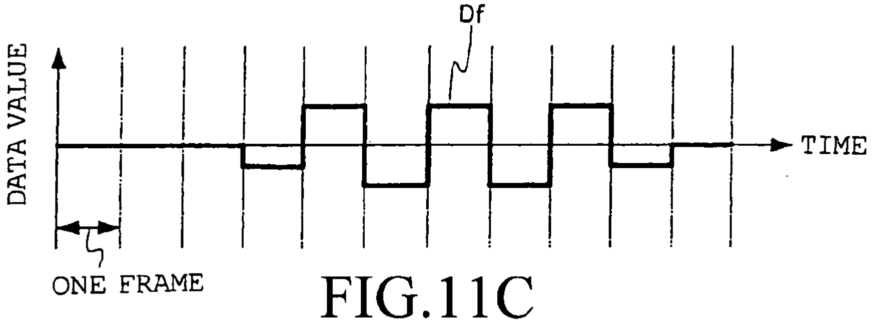
Figure 11D:
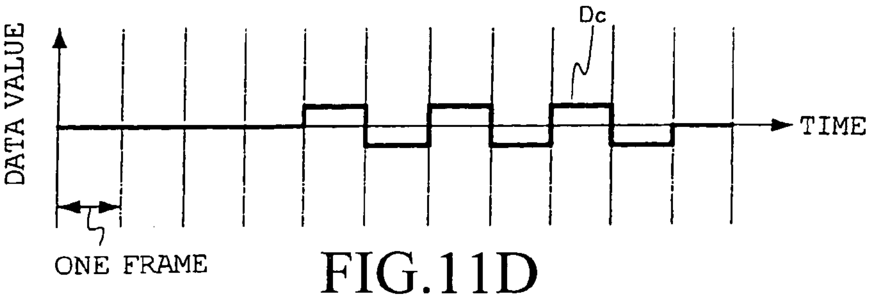
Figure 11E:
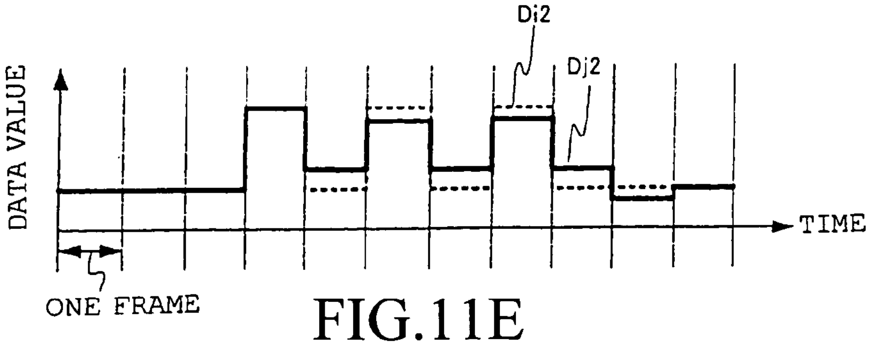

FIGS. 9(*a*), (*b*) and (*c*) are charts each showing a change in gradation characteristic of a target frame to be displayed by the display means 12 in the case where level of a flicker detection signal Ef is not more than Ef1 ($0 \leqq Ef \leqq Ef1$), or in the case where the first coefficient m=1, and the second coefficient n=0 in FIG. 8(*a*).

In the drawings, FIG. 9(*a*) indicates values of a frame data Di2 before compensation, (*b*) indicates values of a frame data Dj2 having been compensated, and (*c*) indicates gradations of a target frame displayed by the display means 12. Additionally, in FIG. 9(*c*), characteristic shown with a broken line indicates gradations of a target frame to be displayed in the case of no compensation, i.e., based on the mentioned frame data Di2.

In the case where number of gradations of a target frame increases as compared with the frame before the target frame by one frame as the change from j frame to (j+1) frame in FIG. 9(*a*), a value of a frame data Dj2 having been compensated with the mentioned gradation rate-of-change compensation amount Dv is (Di2+V1) as shown in FIG. 9(*b*). On the other hand, in the case where number of gradations of a target frame decreases as compared with the frame before the target frame by one frame as the change from k frame to (k+1) frame in FIG. 9(*a*), a value of a frame data Dj2 having been compensated with the mentioned gradation rate-of-change compensation amount Dv is (Di2-V2) as shown in FIG. 9(*b*).

Owing to the performance of this compensation, transmittance of a liquid crystal as for a display pixel (picture element), in which number of gradations of a target frame increases over the preceding frame by one frame, rises as compared with the case where a target frame is displayed based on a frame data Di2 before compensation. Whereas, transmittance of a liquid crystal as for a display pixel (picture element), in which number of gradations of a target frame decreases under the preceding frame by one frame, drops as compared with the case where a target frame is displayed based on a frame data Di2 before compensation.

Thus, as for number of gradations of a target frame displayed by the display means 12, it comes to be possible to make a display gradation (brightness) of a display image change substantially within one frame as shown in FIG. 9(*c*).

FIGS. 10(*a*), (*b*), (*c*), (*d*) and (*e*) are charts each showing a change in gradation characteristic of a display image at the display means 12 in the case where a flicker detection signal Ef is not less than Ef4 ($Ef4 \leqq Ef$), or in the case where the first coefficient m=0, and the second coefficient n=1.

In the drawings, FIG. 10(*a*) indicates values of a frame data Di2 before compensation. FIG. 10(*b*) indicates values of an average gradation data Db (ave) to be outputted from the ½ coefficient unit 25 constituting the flicker suppression compensation amount output means 16. FIG. 10(*c*) indicates values of a flicker suppression compensation amount Df to be outputted from the flicker suppression compensation amount output means 16. FIG. 10(*d*) indicates values of a frame data Dj2 obtained by compensating a frame data Di2. FIG. 10(*e*) indicates gradations of a target frame displayed by the display means 12 based on mentioned frame data Dj2. Further, in FIG. 10(*d*), a solid line indicates values of a frame data Dj2. For the purpose of comparison, a broken line indicates values of a frame data Di2 before compensation. Besides, in FIG. 10(*e*), characteristic indicated by the broken line is a display gradation in the case of no gradation compensation, or in the case where a target frame is displayed based on the mentioned frame data Di2.

As shown in FIG. 10(*a*), in the case of a flicker state in which number of gradations changes periodically every frame, a flicker suppression compensation amount Df as shown in FIG. 10(*c*) is outputted from the flicker suppression compensation amount output means 16. Then, a frame data Di2 is compensated with this flicker suppression compensation amount Df. Accordingly, frame data Di2 having been in the state that components corresponding to a flicker interference are contained, of which variation in data values is significant as shown in FIG. 10(*a*), are compensated so that a data value in a region containing a flicker component in the frame data Di2 before compensation may be a constant data value as a frame data Dj2 shown in FIG. 10(*d*). Thus, in the case of displaying a target frame by the display means 12 based on the mentioned frame data Dj2, it becomes possible to prevent the flicker interference from being displayed.

FIGS. 11(*a*), (*b*), (*c*), (*d*) and (*e*) are charts each showing a change in gradation characteristic of a display image on the display means 12 in the case of m=n=0.5.

In the case of m=n=0.5, display data of a target frame to be displayed at the display means 12 comes to be as shown in FIG. 11(*e*) with the third compensation amount that is generated from the mentioned gradation rate-of-change compensation amount Dv and a flicker suppression compensation amount Df. Further, in FIG. 11(*e*), a solid line indicates values of a frame data Dj2, and for comparison, a broken line indicates values of a frame data Di2 before compensation.

Figure 12:
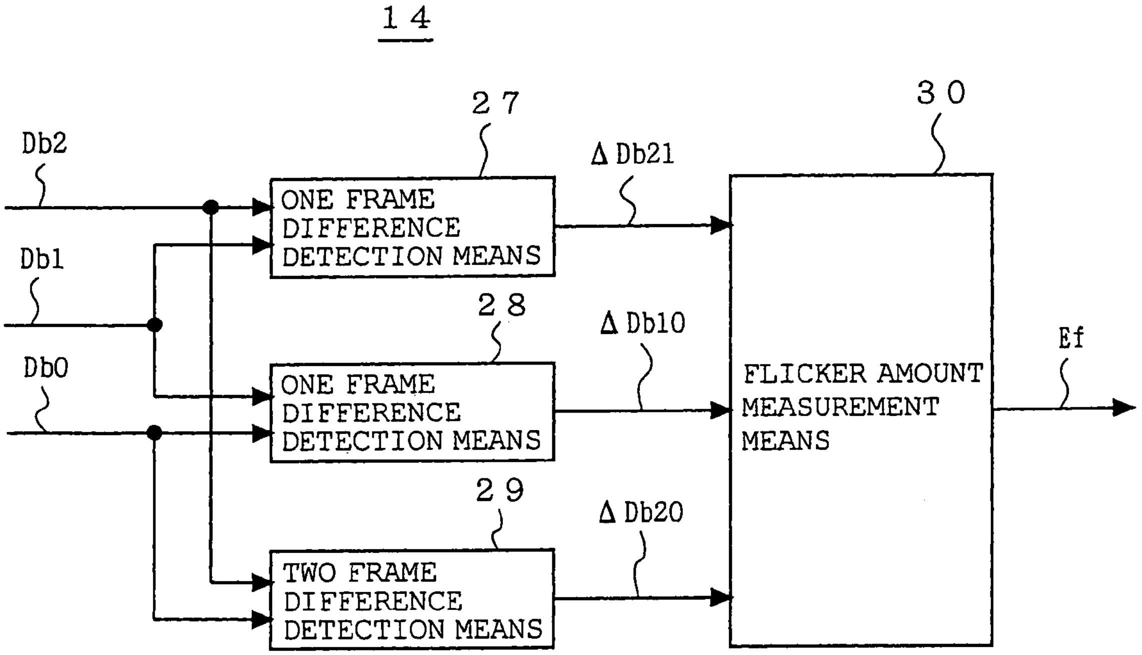
FIG. 12 is a diagram for explaining a constitution of a flicker detector according to the first embodiment.

FIG. 12 is an example of an internal constitution of the flicker detector 14 of FIG. 2.

First one-frame difference detection means 27, to which the mentioned first decoded data Db2 and the mentioned second decoded data Db1 have been inputted, outputs to flicker amount measurement means 30 a first differential signal ΔDb21 that is obtained based on the mentioned first decoded data Db2 and the mentioned second decoded data Db1.

Second one-frame difference detection means 28 to which the mentioned second decoded data Db1 and the mentioned third decoded data Db0 have been input, outputs to the flicker amount measurement means 30 a second differential signal ΔDb10 that is obtained based on the mentioned second decoded data Db1 and the mentioned third decoded data Db0.

Furthermore, two-frame difference detection means 29, to which the mentioned first decoded data Db2 and the mentioned third decoded data Db0 have been inputted, outputs to the flicker amount measurement means 30 a third differential signal ΔDb20 that is obtained based on the mentioned first decoded data Db2 and the mentioned third decoded data Db0.

The flicker amount measurement means 30 outputs a flicker detection signal Ef based on the mentioned first differential signal ΔDb21, the mentioned second differential signal ΔDb10 and the mentioned third differential signal ΔDb20.

Figure 13:
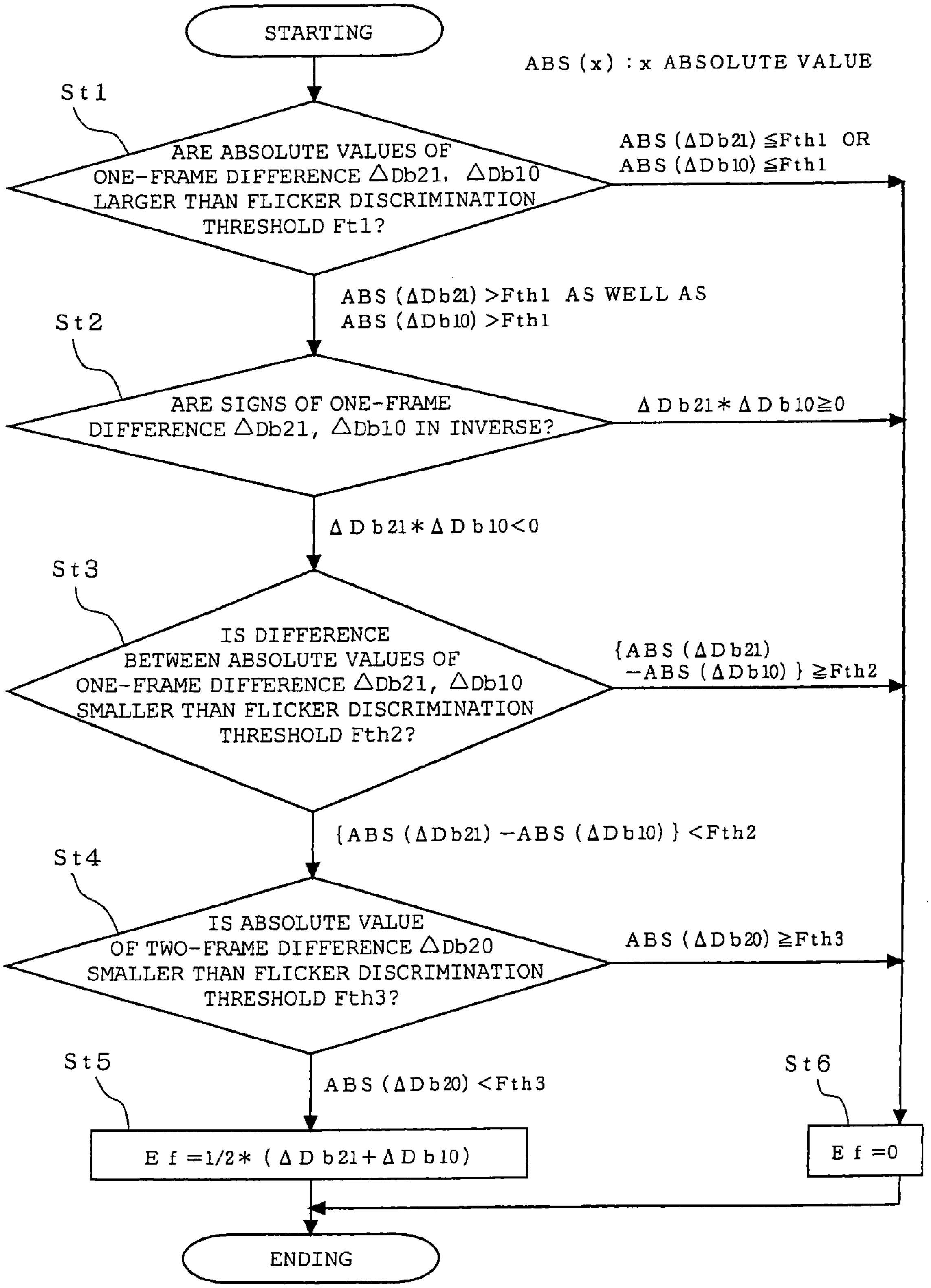
FIG. 13 is a flowchart explaining operations of the flicker detector according to the first embodiment.

FIG. 13 is a flowchart showing one example of operations of the flicker amount measurement means 30 of FIG. 12.

Hereinafter, the operations of the flicker amount measurement means 30 are described with reference to FIG. 13.

A first flicker amount measurement step St1 is provided with a first flicker discrimination threshold Fth1 in which magnitude in change between number of gradations of a target frame and that of the frame before this target frame by one frame is a magnitude in minimum change in number of gradations to be processed as a flicker interference. Thus, in the mentioned first flicker amount measurement step St1, it is determined whether or not magnitude of the mentioned first differential signal ΔDb21 and the mentioned second differential signal ΔDb10, for example, an absolute value of the difference is larger than the mentioned first flicker discrimination threshold Fth1.

In the flowchart of FIG. 13, ABS (ΔDb21) and ABS (ΔDb21) denote an absolute value of the mentioned first differential signal ΔDb21 and the mentioned second differential signal ΔDb10.

In second flicker amount measurement step St2 it is determined whether or not a sign of the mentioned first differential signal ΔDb21 (plus or minus) and a sign of the mentioned second differential signal ΔDb10 (plus or minus) are in inverse.

Specifically, by carrying out an operation of $$(\Delta Db21)*(\Delta Db10),$$

the second flicker amount measurement step St2 determines a relation between the signs of the mentioned first differential signal ΔDb21 and the mentioned second differential signal ΔDb10.

A third flicker amount measurement step St3 is provided with a second flicker discrimination threshold Fth2, and in which it is determined whether or not a difference between values of the mentioned first differential signal ΔDb21 and the mentioned second differential signal ΔDb10 is smaller than the second flicker discrimination threshold Fth2. Thus, in the third flicker amount measurement step St3 it is determined whether or not the change in number of gradations of frames before and after is repeated.

Specifically, the third flicker amount measurement step St3 carries out an operation of $$ABS\ (\Delta Db21)-ABS\ (\Delta Db10),$$

and compares a result of this operation with the mentioned second flicker discrimination threshold Fth2.

A fourth flicker amount measurement step St4 is provided with a third flicker discrimination threshold Fth3, and compares level of the mentioned third differential signal ΔDb20 with the mentioned flicker discrimination threshold Fth3. Thus, in the fourth flicker amount measurement step St4, it is determined whether or not number of gradations of a target frame and number of gradations of the frame before this target frame by two frames are the same.

In the case where it is determined by the above-mentioned steps from the first flicker amount measurement step St1 to the fourth flicker amount measurement step St4 that there is any component equivalent to a flicker interference in the mentioned first decoded data Db2, a flicker detection signal Ef is outputted in a fifth flicker amount measurement step St5 as follows:

$$Ef=\frac{1}{2}*(\Delta Db21+\Delta Db10)$$

On the contrary, in the case where it is determined by the above-mentioned steps from the first flicker amount measurement step St1 to the fourth flicker amount measurement step St4 that there is no component equivalent to a flicker interference in the mentioned first decoded data Db2, a flicker detection signal Ef is outputted in a sixth flicker amount measurement step St6 as follows:

$$Ef=0$$

Then, the operations from the mentioned first flicker amount measurement step St1 to the mentioned sixth flicker amount measurement step St6 are carried out for each data corresponding to the picture elements at the display means 12 out of the frame data Di2.

As described above, according to the image display device according to this first embodiment, it comes to be possible to adaptively compensate the frame data Di2 depending on whether or not any component equivalent to the flicker interference is contained in the frame data Di2 corresponding to a target frame.

Specifically, in the case where no component equivalent to the flicker interference is contained in the mentioned frame data Di2, when number of gradations of the mentioned target frame is changed with respect to that of the frame before the target frame by one frame, the mentioned frame data Di2 are compensated so that this change may be represented faster by the display means 12, and the compensated frame data Dj2 are generated.

Consequently, owing to the fact that displaying a target frame is carried out by the display means 12 based on the mentioned frame data Dj2, it becomes possible to improve gradation rate-of-change of a display image at a normal drive voltage without any change in drive voltage applied to the liquid crystal.

On the other hand, in the case where any component equivalent to the flicker interference is contained in the frame data Di2, as well as it is determined that the component equivalent to this flicker interference assuredly becomes the flicker interference in a target frame to be displayed by the display means 12, the frame data Di2 are compensated so that transmittance of the liquid crystal in the display means 12 may be an average number of gradations of a flicker state, and the frame data Dj2 are generated. Accordingly, it comes to be possible to make constant a display gradation in the case of displaying a target frame by the display means 12. Consequently, influence of the flicker interference on a displayed target frame can be suppressed.

In addition, in the case where any component equivalent to the flicker interference is contained in the frame data Di2, as well as the component equivalent to this flicker interference exerts the influence on image quality of a target frame to be displayed by the display means, the third compensation amount is generated based on a gradation rate-of-change compensation amount Dv and a flicker suppression compensation amount Df depending on degrees of the component equivalent to this flicker interference. Then, the mentioned frame data Di2 are compensated with this third compensation amount, and the frame data Dj2 are generated.

Consequently, in the case of displaying a target frame by the display means based on the mentioned frame data Dj2, as compared with the case of displaying any target frame based on the mentioned frame data Di2, it becomes possible to display at a normal drive voltage a frame in which occurrence of, e.g., flicker interference is suppressed, and rate-of-change in gradation is improved.

Specifically, in the image display device according to the first embodiment, at the time of displaying any target frame by the display means, it comes to be possible to improve the rate-of-change in display gradation, and prevent a image quality from deterioration due to unnecessary increase and decrease in number of gradations accompanied by, e.g., occurrence of flicker interference.

Furthermore, due to the fact that the frame data Di2 corresponding to a target frame are encoded by the encoding means 4 and compression of data capacity is carried out, it becomes possible to reduce capacity of the memory necessary for delaying the mentioned frame data Di2 by one frame time period or two frame time period. Thus, it comes to be possible to simplify the delay means and reduce a circuit scale. Besides, encoding without making the mentioned frame data Di2 thin (i.e., without skipping the frame data Di2) carries out the compression of data capacity. Therefore, it is possible to enhance accuracy in the frame data compensation amount Dc and carry out optimum compensation.

In addition, since encoding is not carried out as to the frame data Di corresponding to a target frame to be displayed, it becomes possible to display the mentioned target frame without exerting any influence of errors that may be caused by coding and decoding.

Further, although the data, which is inputted to the gradation rate-of-change compensation amount output means 15, are of 8 bits in the above-mentioned descriptions of operation, it is not limited to this case. It is also preferable to be of any number of bits as far as the data are of number of bits enabling to substantially generate compensation data by, e.g., an interpolation processing.

Embodiment 2

A second preferred embodiment is to simplify an internal constitution of the flicker suppression compensation amount output means 16 in the image display device according to the foregoing first embodiment. Hereinafter, such a simplified flicker suppression compensation amount output means 16 is described. Except that there is no input of the decoded data Db0 to the compensation amount output device 13 resulted from the simplification of the flicker suppression compensation amount output means 16, constitution and operation other than those of the flicker suppression compensation amount output means 16 are the same as described in the foregoing first embodiment, so that repeated description thereof is omitted.

Figure 14:
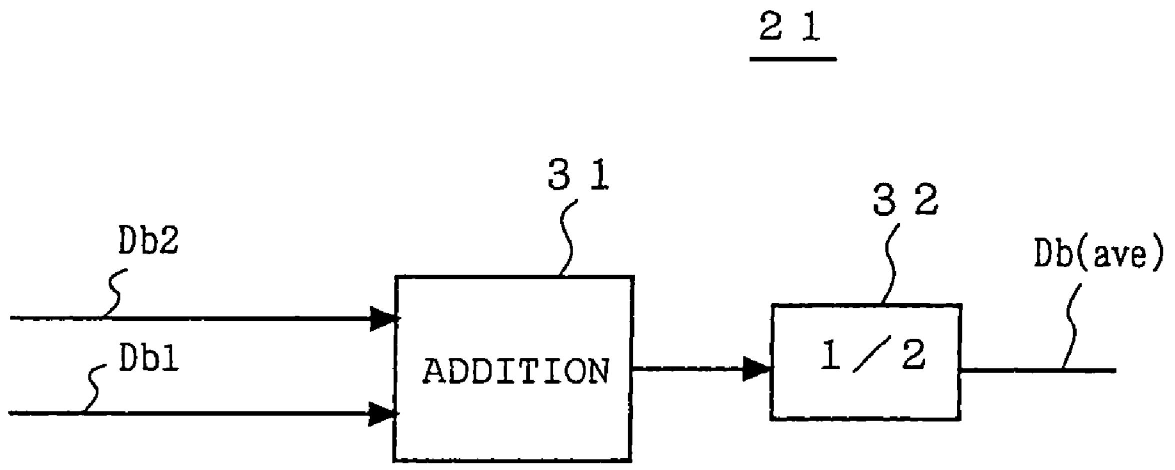
FIG. 14 is a diagram showing a part of an internal constitution of flicker suppression compensation amount output means according to a second preferred embodiment.
Figure 15A:
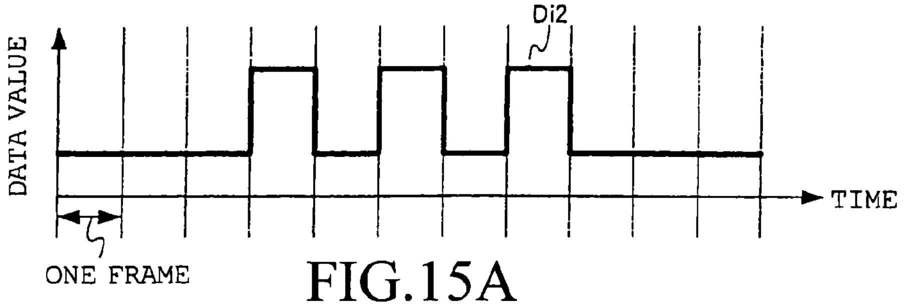
FIGS. 15(*a*), (*b*), (*c*), (*d*) and (*e*) are charts each showing change in gradation characteristic of a display image in the case where a first coefficient m=0, and a second coefficient n=1 in the second embodiment.
Figure 15B:
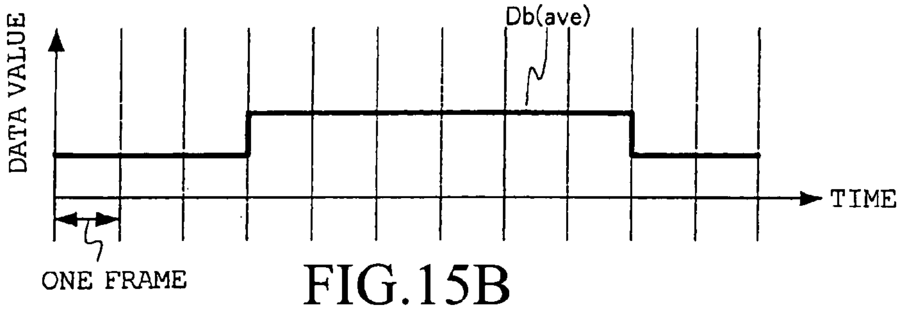
Figure 15C:
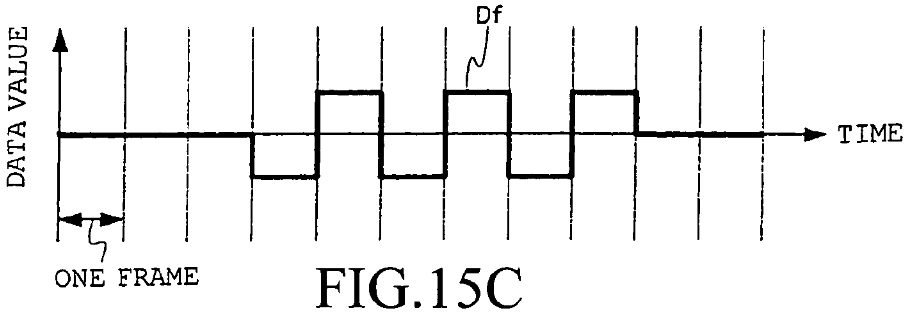
Figure 15D:
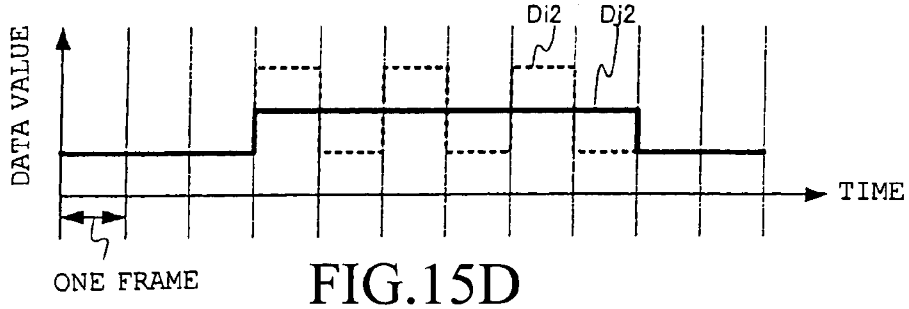
Figure 15E:
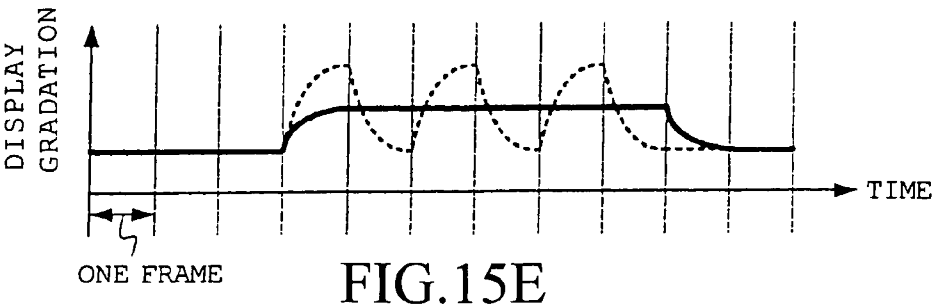

FIG. 14 shows an example, in which the part 21 surrounded by a broken line is simplified in FIG. 6 that shows the mentioned flicker suppression compensation amount output means 16 according to the first embodiment.

The first decoded data Db2 and the second decoded data Db1, which have been inputted to the flicker suppression compensation amount output means 16, are further inputted to an adder 31.

The adder 31, to which mentioned first decoded data Db2 and mentioned second decoded data Db1 have been inputted, outputs to ½ coefficient unit 32 data (Db2+Db1) obtained by adding these decoded data.

The addition data (Db2+Db1), which have been outputted from the adder 31, become (Db2+Db1)/2 through the ½ coefficient unit 32. Specifically, the mentioned ½ coefficient unit outputs the average gradation data Db (ave) equivalent to an average gradation between a gradation of a target frame and a gradation of the frame before this target frame by one frame.

FIGS. 15(*a*), (*b*), (*c*), (*d*) and (*e*) are charts each showing a change in gradation characteristic of a target frame, which is displayed by the display means 12 according to this second embodiment, in the case where a flicker detection signal Ef is not less than Ef4 (Ef4≦Ef), or in the case where the first coefficient m=0, and the second coefficient n=1.

In the drawings, FIG. 15(*a*) indicates values of a frame data Di2 before compensation. FIG. 15(*b*) indicates values of an output data Db from the ½ coefficient unit 32 constituting the flicker suppression compensation amount output means 16 according to the second embodiment. FIG. 15(*c*) indicates values of a flicker suppression compensation amount Df to be outputted from the flicker suppression compensation amount output means 16 according to the second embodiment. FIG. 15(*d*) indicates values of a frame data Dj2 obtained by compensating a frame data Di2. FIG. 15(*e*) indicates display gradations of a target frame displayed by the display means 12 based on mentioned frame data Dj2. In FIG. 15(*d*), a solid line indicates values of a frame data Dj2, and for comparison, a broken line indicates values of a frame data Di2 before compensation. Further, in FIG. 15(*e*), characteristic shown with the broken line indicates a display gradation in the case of no compensation, or in the case where a target frame is displayed based on the mentioned frame data Di2.

As shown in FIG. 15(*a*), in the case of a flicker state in which number of gradations changes periodically every frame, a flicker suppression compensation amount Df as shown in FIG. 15(*c*) is outputted from the flicker suppression compensation amount output means 16. Further, the mentioned flicker suppression compensation amount Df is obtained by subtracting the mentioned average gradation data Db (ave) from the mentioned second decoded data Db1. Then, frame data Di2 are compensated with this flicker suppression compensation amount Df.

Accordingly, the frame data Di2 having been in the state that a flicker component is contained and variation in data values is significant as shown in FIG. 15(*a*), are compensated so that a data value in a region containing a flicker component in the frame data Di2 before compensation may be a constant data value like frame data Dj2 shown in FIG. 15(*d*). Thus, in the case of displaying a target frame by the display means 12 based on the mentioned frame data Dj2, it becomes possible to prevent the flicker interference from being displayed.

As described above, according to the image display device of this second embodiment, it become possible to obtain the same advantages as in the foregoing first embodiment while achieving simplification of internal constitution of the flicker suppression compensation data generation means 16.

As seen from the comparison between FIG. 10(*e*) shown in the foregoing first embodiment and FIG. 15(*e*) shown in this second embodiment, according to this second embodiment, it comes to be possible to display a target frame without generating any overshoot observed at the change in number of gradations from j frame to (j+1) frame, and at the change in number of gradations from k frame to (k+1) frame in FIG. 10(*e*).

Embodiment 3

An image display device according to a third preferred embodiment is to simplify the system constitution of the image display device of the foregoing first and second embodiments.

Further, the image display device according to this third embodiment makes it possible to suppress flicker interference at a vertical edge occurring in the case where an image signal to be inputted to the mentioned image display device is an interlace signal.

The flicker interference occurs at a vertical edge of an interlace signal. Thus, in the case where any image signal to be inputted is the interlace signal, it is possible to detect flicker interference by detecting a vertical edge.

Figure 16:
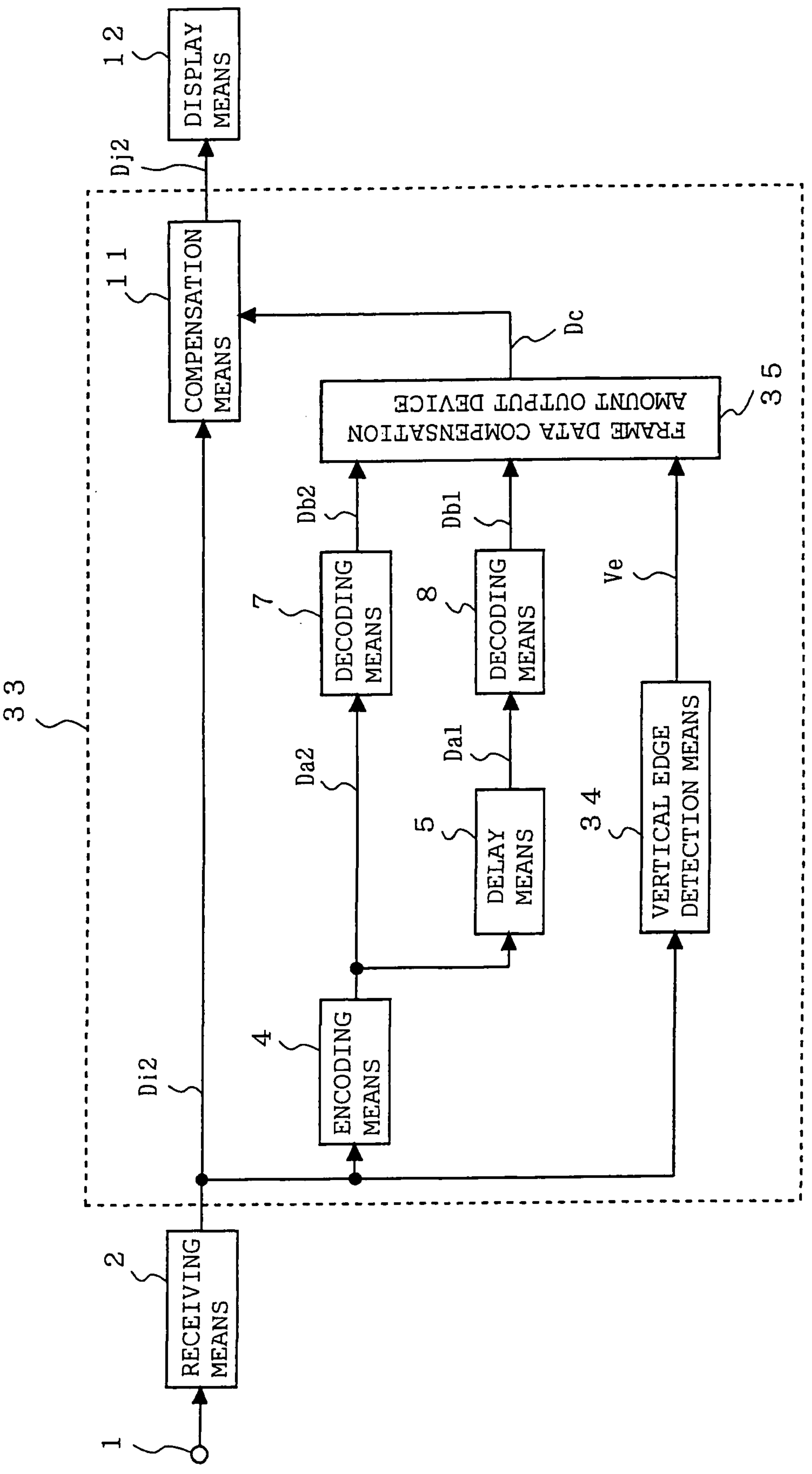
FIG. 16 is a diagram showing a constitution of an image display device according to a third preferred embodiment.

FIG. 16 is a block diagram showing a constitution of an image display device according to the third embodiment. In the image display device according to this third embodiment, an image signal is inputted to an input terminal 1.

An image signal having been inputted to the input terminal 1 is received by receiving means 2. Then, the image signal having been received by the receiving means 2 is outputted to a frame data compensation device 3 as frame data Di2 of a digital format (hereinafter, the frame data are also referred to as image data). Herein, the mentioned frame data Di2 stand for those data corresponding to number of gradations, a chrominance differential signal and the like that are included in an image signal to be inputted. Further, the mentioned frame data Di2 are frame data corresponding to a frame targeted (hereinafter, referred to as a target frame) to be compensated by the frame data compensation device 33 out of the frames included in the inputted image signal. In addition, in this third embodiment, the case of compensating the frame data Di2 corresponding to number of gradations of the mentioned target frame is described.

The frame data Di2 having been outputted from the receiving means 2 are compensated by the frame data compensation device 33, and outputted to the display means 12 as the frame data Dj2 having been compensated.

The display means 12 displays a compensated frame based on the frame data Dj2 having been outputted from the frame data compensation device 33.

Hereinafter, operations of the frame data compensation device 33 according to the third embodiment are described.

The frame data Di2 having been outputted from the receiving means 2 are first encoded by encoding means 4 in the frame data compensation device 33 whereby data capacity of the frame data Di2 is compressed.

Then, the encoding means 4 outputs first encoded data Da2, which are obtained by encoding the mentioned frame data Di2, to first delay means 5 and first decoding means 7. Herein, as for encoding method of the frame data Di2 at the encoding means 4, any encoding method including a 2-dimensional discrete cosine transform encoding method such as JPEG, a block encoding method such as FBT or GBTC, a prediction encoding method such as JPEG-LS, and a wavelet transform such as JPEG2000, can be employed on condition that the method is used for still image. As for the above-mentioned encoding method for the static image, either a lossless (reversible) encoding method in which frame data before encoding and the coded frame data are completely coincident or a lossy (non-reversible) encoding method in which both of them are not coincident can be employed. Further, either variable length encoding method in which encoding amount varies depending on an image data, or a fixed-length encoding method in which an encoding amount is constant can be employed.

The delay means 5, which receives the mentioned first encoded data Da2 having been outputted from the encoding means 4, outputs to second decoding means 8 second encoded data Da1 corresponding to a frame before the frame corresponding to the mentioned first encoded data Da2 by one frame.

Further, the first decoding means 7, which receives the mentioned first encoded data Da2 having outputted from the encoding means 4, outputs to a frame data compensation amount output device 35 first decoded data Db2 that can be obtained by decoding mentioned first encoded data Da2.

Furthermore, the second decoding means 8, which receives the second encoded data Da1 having been outputted from the first delay means 5, outputs to the frame data compensation amount output device 35 second decoded data Db1 that can be obtained by decoding the mentioned second encoded data Da1.

Vertical edge detection means 34 receives frame data Di2 corresponding to a target frame to be outputted from the receiving means 2, and outputs a vertical edge level signal Ve to the frame data compensation output device 35. Herein, a vertical edge level signal Ve stands for degrees of the flicker interference at the vertical edge, that is, a signal corresponding to a degree of change in number of gradations.

The frame data compensation amount output device 35 outputs to compensation means 11 a compensation amount Dc to compensate number of gradations of the frame data Di2 based on the first decoded data Db2 and second decoded data Db1, and a vertical edge level signal Ve.

The compensation means 11 to which a compensation amount Dc is inputted compensates the mentioned frame data Di2 based on this compensation amount Dc, and outputs to the display means 12 frame data Dj2 obtained by this compensation.

Furthermore, a compensation amount Dc is set to be such a compensation amount as is capable of carrying out compensation so that gradation of a target frame to be displayed based on the mentioned frame data Di2 may be within a range of gradation that can be displayed by the display means 12. Accordingly, for example, in the case where the display means can display a gradation of up to 8 bits, a compensation amount Dc is set to be the one that is capable of carrying out the compensation so that gradation of a target frame to be displayed based on the mentioned frame data Dj2 may be in a range from 0 gradation to 255 gradations.

In addition, in the frame data compensation device 33, it is possible to carry out the compensation of the frame data Di2 even if there is none of the mentioned encoding means 4, first decoding means 7, and second decoding means 8. However, data capacity of any frame data can be made smaller by providing the mentioned encoding means 4. Thus it becomes possible to reduce recording means comprising a semiconductor memory, a magnetic disc or the like that constitutes the delay means 5, thereby enabling to make a circuit scale smaller as the whole device. Further, by making an encoding factor (data compression factor) of the encoding means 4 higher, it is possible to make smaller capacity of, e.g., memory necessary for delaying the mentioned first encoded data Da2 in the mentioned first delay means 5.

Furthermore, due to the fact that there is provided the decoding means, which decodes an encoded data, it comes to be possible to eliminate influence caused by errors generated by encoding and compression.

Hereinafter, the frame data compensation amount output device 35 according to the third embodiment is described.

Figure 17:
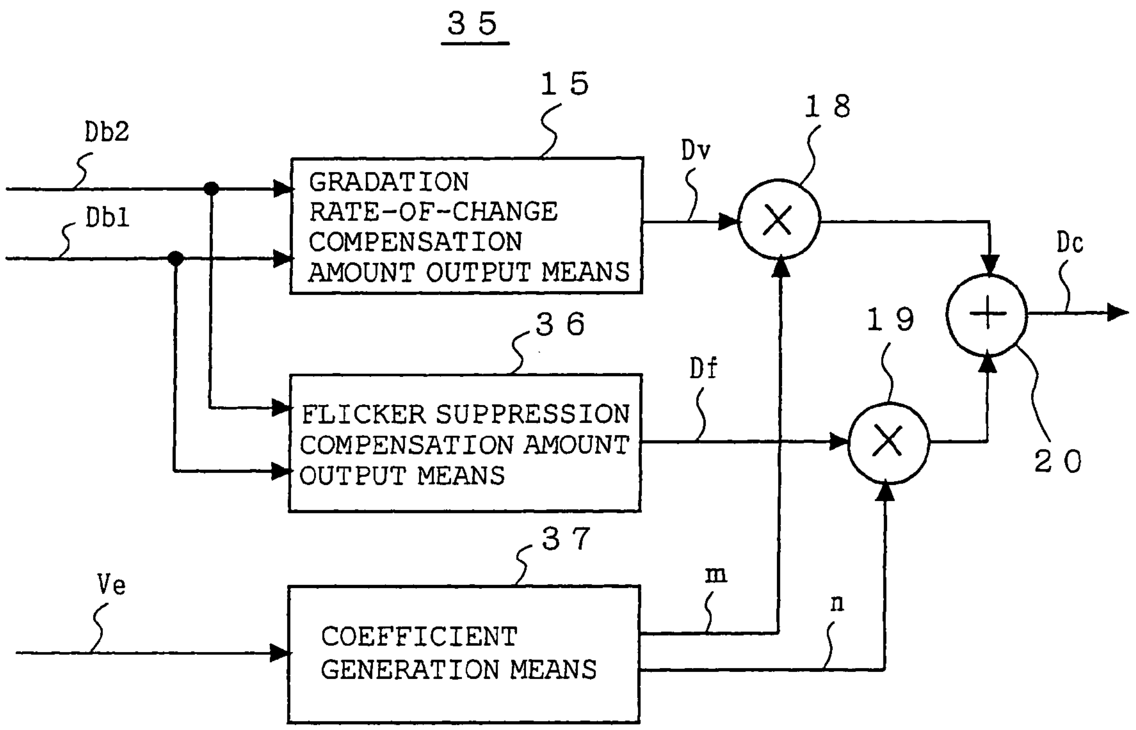
FIG. 17 is a diagram showing a constitution of a compensation amount output device according to the third embodiment.

FIG. 17 is an example of an internal constitution of the frame data compensation amount output device 35 of FIG. 16.

With reference to FIG. 17, the first decoded data Db2 and the second decoded data Db1, which have been outputted from the first decoding means 7 and the second decoding means 8 respectively, are inputted to each of gradation rate-of-change compensation amount output means 15 and flicker suppression compensation amount output means 36. Then, the mentioned gradation rate-of-change compensation amount output means 15 and flicker suppression compensation amount output means 36 output a gradation rate-of-change compensation amount Dv and a flicker suppression compensation amount Df to a first coefficient unit 18 and a second coefficient unit 19 respectively based on the mentioned first decoded data Db2 and the mentioned second decoded data Db1.

Coefficient generation means 37 outputs a first coefficient m and a second coefficient n based on a vertical edge level signal Ve to be outputted from the vertical edge detection means 34.

Then, the frame data compensation amount output device 35 outputs a compensation amount Dc to compensate the frame data Di2 based on the mentioned gradation rate-of-change compensation amount Dv, flicker suppression compensation amount Df, first coefficient m and second coefficient n.

With reference to FIG. 17, the gradation rate-of-change compensation amount output means 15 is preliminarily provided with a lookup table as shown in FIG. 4, the table consisting of compensation amounts Dv to compensate number of gradations of the frame data Di2 likewise the mentioned first embodiment. Then, the gradation rate-of-change compensation amount output means 15 outputs to a first coefficient unit 18 the mentioned gradation rate-of-change compensation amount Dv from the lookup table based on the mentioned first decoded data Db2 and the mentioned second decoded data Db1.

The flicker suppression compensation amount output means 36 outputs to the mentioned second coefficient unit 19 a flicker suppression compensation amount Df to compensate the frame data Di2 containing data corresponding to a flicker interference based on the mentioned first decoded data Db2 and the mentioned second decoded data Db1.

The coefficient generation means 17 outputs the first coefficient m, by which a gradation rate-of-change compensation amount Dv is multiplied, and the second coefficient n, by which a flicker suppression compensation amount Df is multiplied, to the first coefficient unit 18 and the second coefficient unit 19 respectively in accordance with the vertical edge level signal Ve outputted from the vertical edge detection means 34.

The first coefficient unit 18 and second coefficient unit 19 multiply respective gradation rate-of-change compensation amount Dv and flicker suppression compensation amount Df by the first coefficient m and second coefficient n having been outputted from the coefficient generation means 17 respectively. Then, (m*Dv) and (n*Df) are outputted to an adder 20 from the first coefficient unit 18 and the second coefficient unit 19 respectively.

The adder 20 adds (m*Dv), which is outputted from the mentioned first coefficient unit 18, and (n*Df), which is outputted from the mentioned second coefficient unit 19, and outputs a compensation amount Dc.

Figure 18:
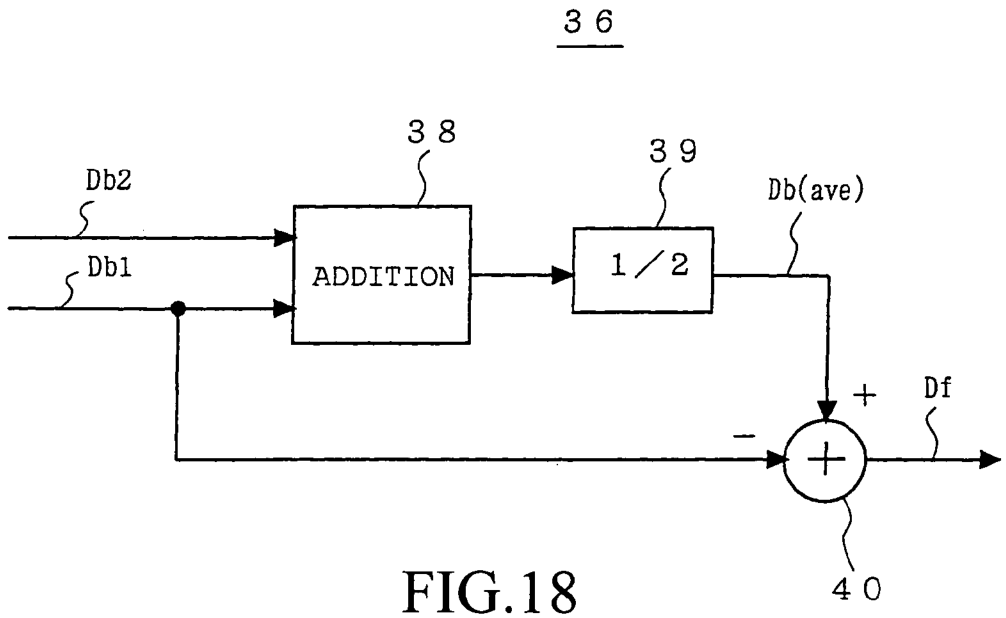
FIG. 18 is a diagram showing a constitution of flicker suppression compensation amount output means according to the third embodiment.

FIG. 18 is an example of an internal constitution of the flicker suppression compensation amount output means 36 of FIG. 17.

The mentioned first decoded data Db2 and the mentioned second decoded data Db1 are outputted to an adder 38.

The adder 38 adds the mentioned first decoded data Db2 and second decoded data Db1, and outputs an addition result (Db2+Db1) to a ½ coefficient unit 39.

The addition data (Db2+Db1), which have been outputted from the adder 38, are made into data of ½ size, ((½)*(Db2+Db1)) through the ½ coefficient unit 39, which are then outputted to a subtracter 40. The data of ½ size, which are outputted from the ½ coefficient unit 39, are the data equivalent to an average gradation of gradations of a target frame and the frame before the target frame by one frame. Hereinafter, the data are referred to as average gradation data Db (ave).

In the case where any flicker interference occurs when a target frame is displayed by the display means 12, the mentioned average gradation data Db (ave) are equivalent to an average gradation of a flicker part.

A subtracter 40 generates a flicker suppression compensation amount Df by subtracting the average gradation data Db (ave) from the mentioned second decoded data Db1, and outputs this flicker suppression compensation amount Df to the second coefficient unit 19.

Figure 19:
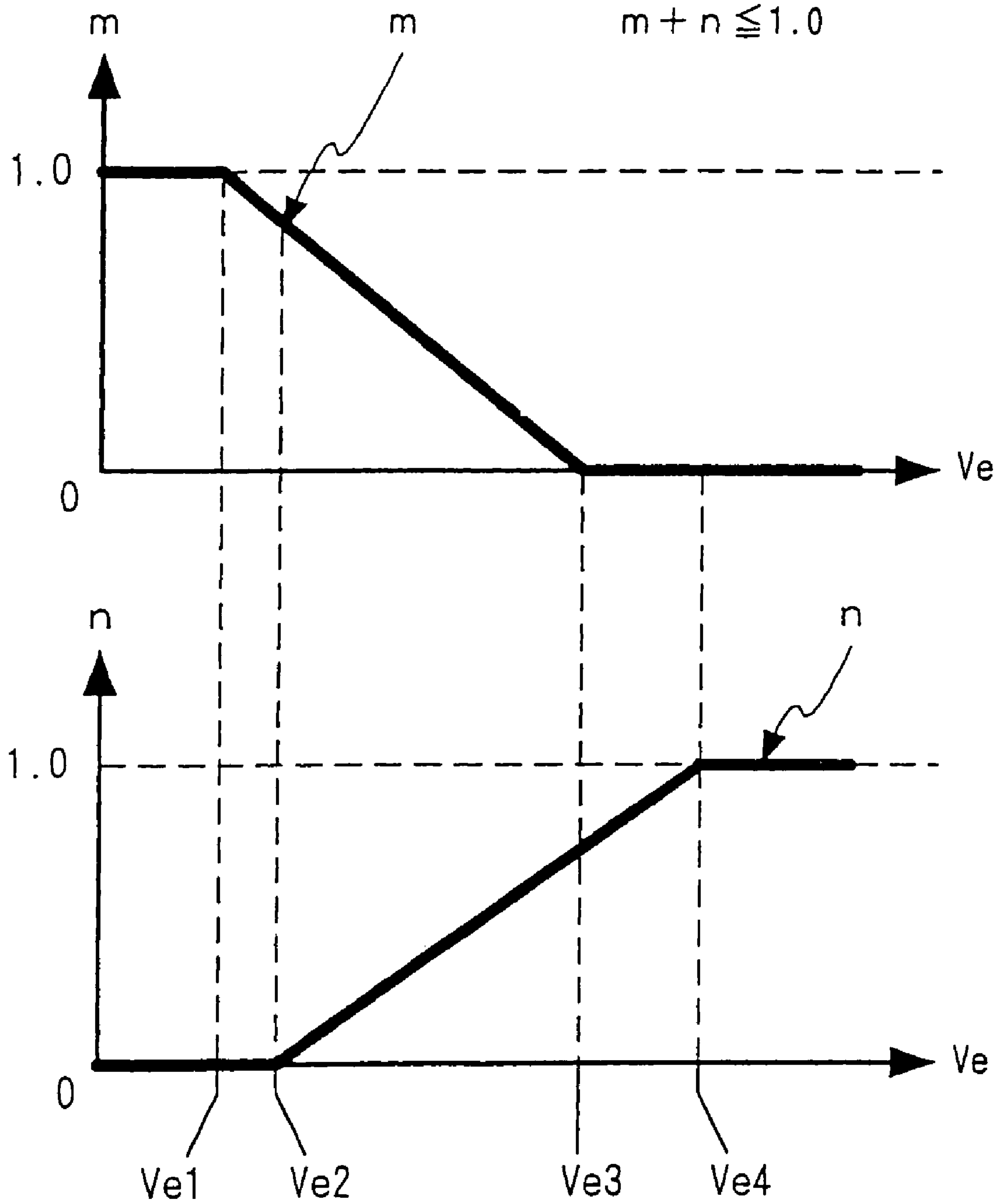
FIG. 19 is a chart for explaining operations of coefficient generation means according to the third embodiment.

Values of the coefficients m and n, which are outputted from the coefficient generation means 17, are determined in accordance with a vertical edge level signal Ve as shown in FIG. 19.

In the case where level of the vertical edge level signal Ve is not more than Ve1 (0≦Ve≦Ve1), that is, in the case where a component equivalent to a vertical edge is not contained in the frame data Di2, or in the case where a component equivalent to the foregoing vertical edge exerts no influence on image quality of a target frame to be displayed by the display means even if any component equivalent to the mentioned vertical edge is contained, the first coefficient m and the second coefficient n are outputted so that only a gradation rate-of-change compensation amount Dv may be the compensation amount Dc. Accordingly, m=1 and n=0 are outputted from the coefficient generation means.

In the case where level of the vertical edge level signal Ve is not less than Ve4 (Ve4≦Ve), that is, in the case where any component equivalent to a vertical edge is contained in the frame data Di2, the first coefficient m and the second coefficient n are outputted so that only a flicker suppression compensation amount Df may be the compensation amount Dc. Accordingly, m=0 and n=1 are outputted from the coefficient generation means 17.

In the case where level of the vertical edge level signal Ve is larger than Ve1 and smaller than Ve4 (Ve1<Ve<Ve4), the first coefficient m and the second coefficient n are outputted so that a third compensation amount that is generated based on a gradation rate-of-change compensation amount Dv and a flicker suppression compensation amount Df may be a compensation amount Dc. Accordingly, the first coefficient m and second coefficient n that satisfy the conditions of $$0<m<1 \text{ and } 0<n<1,$$

are outputted from the coefficient generation means 17.

Further, the first coefficient m and the second coefficient n are set so as to satisfy the condition of m+n ≦1. In case of not satisfying this condition, it is possible that the frame data Dj2, which are obtained by compensating the frame data Di2 with the compensation amount Dc to be outputted from the frame data compensation amount output device 10, contain data corresponding to number of gradations exceeding number of gradations capable of being displayed by the display means 12. Specifically, such a problem occurs that a target frame cannot be displayed even if the mentioned target frame is intended to display by the display means based on the mentioned frame data Dj2

Furthermore, although change in the first coefficient m and the second coefficient n is shown with a straight line, it is preferable to be, e.g., a curved line in case of monotonic change.

Additionally, even in this case, it is a matter of course that the first coefficient m and the second coefficient n are set so as to satisfy the mentioned condition, i.e., m+n≦1.

Figure 20A:
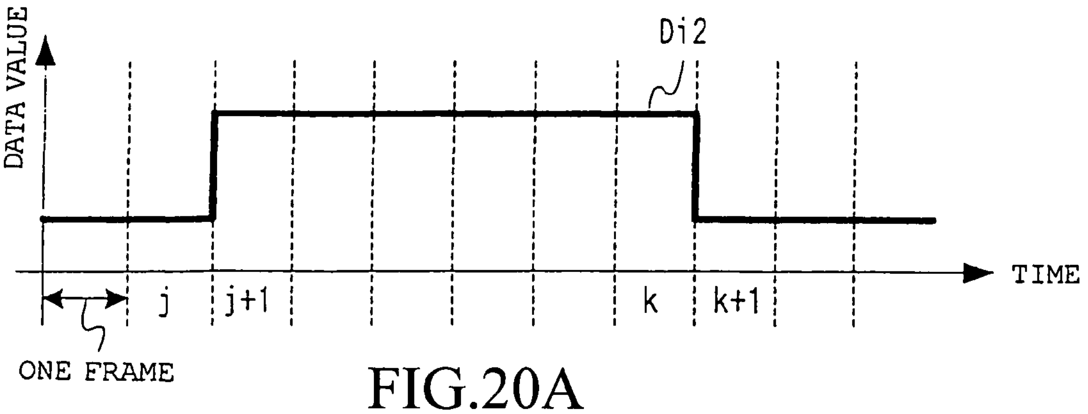
FIGS. 20(*a*), (*b*) and (*c*) are charts each showing change in gradation characteristic of a display image in the case where a first coefficient m=1, and a second coefficient n=0 in the third embodiment.
Figure 20B:
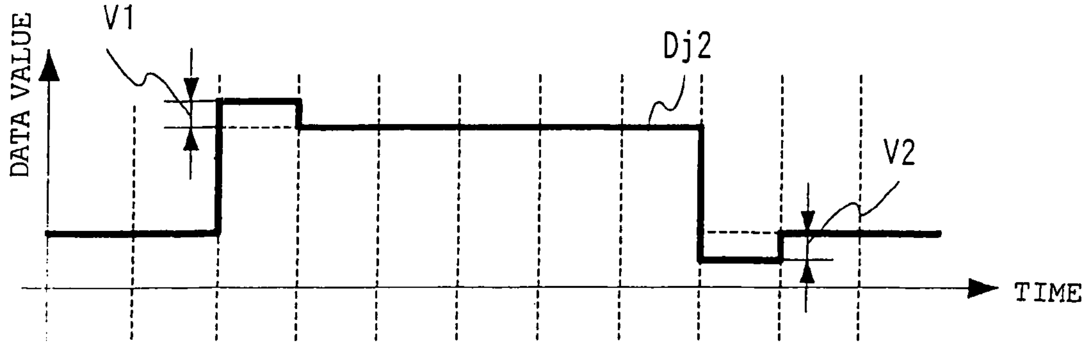
Figure 20C:
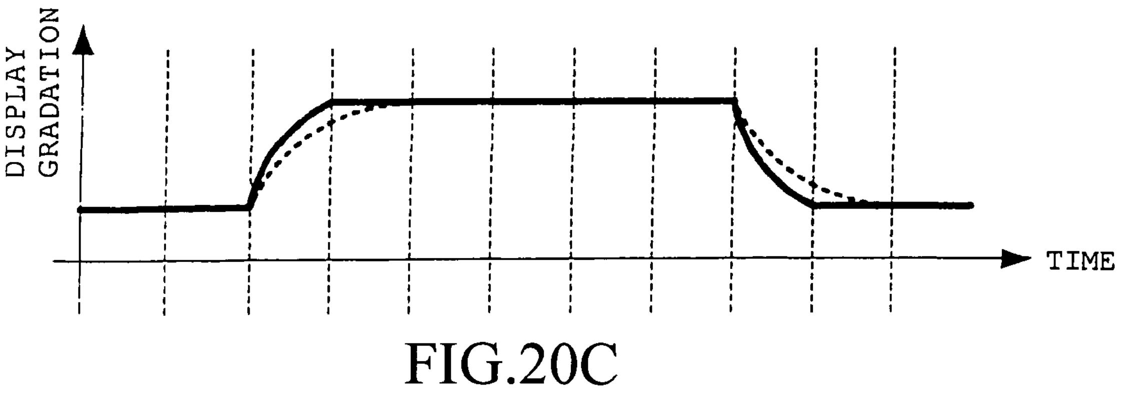
Figure 21A:
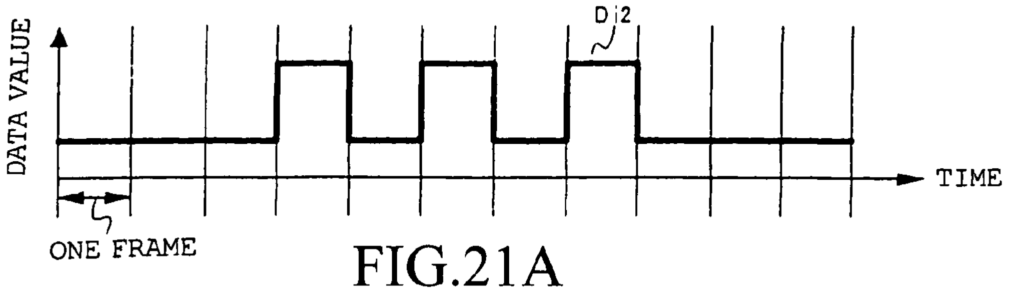
FIGS. 21(*a*), (*b*), (*c*), (*d*) and (*e*) are charts each showing change in gradation characteristic of a display image in the case where the first coefficient m=0, and the second coefficient n=1 in the third embodiment.
Figure 21B:
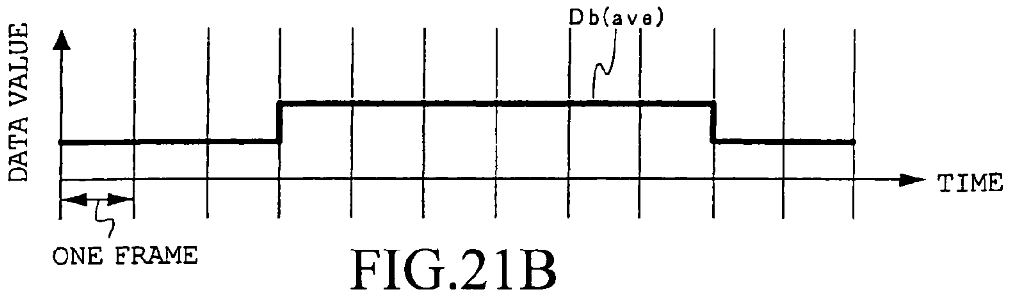
Figure 21C:
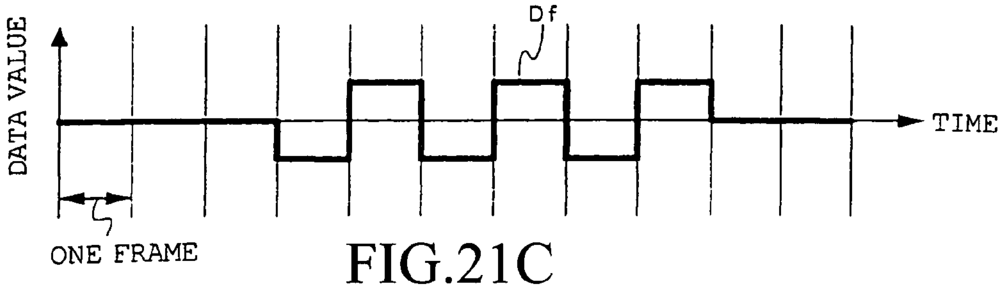
Figure 21D:
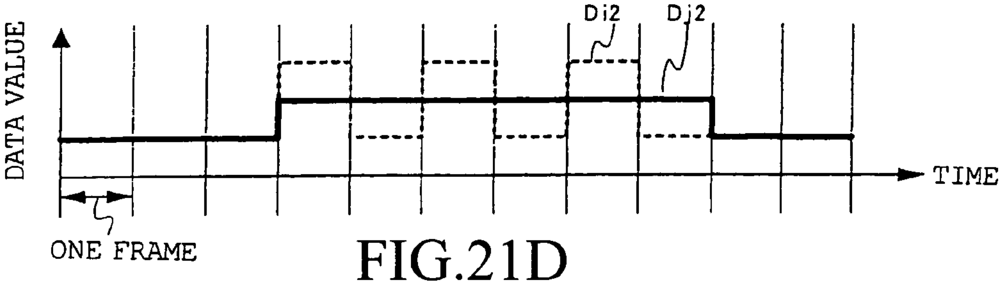
Figure 21E:
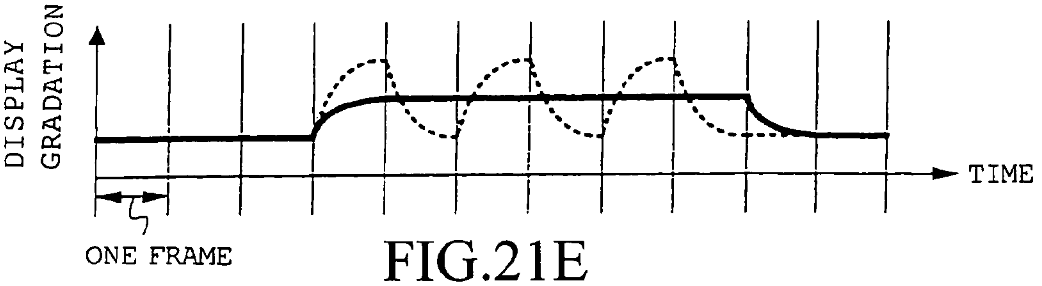

FIGS. 20(*a*), (*b*) and (*c*) are charts each showing a change in gradation characteristic of a target frame to be displayed by the display means 12 in the case where level of the vertical edge detection signal Ve is not more than Ve1 ($0 \leqq Ve \leqq Ve1$), or in the case where the first coefficient m=1, and the second coefficient n=0.

In the drawings, FIG. 20(*a*) indicates values of a frame data Di2 before compensation, FIG. 20(*b*) indicates values of a frame data Dj2 having been compensated, and FIG. 20(*c*) indicates gradations of a target frame displayed by the display means 12 based on the compensated frame data Dj2. Further, in FIG. 20(*c*), characteristic shown with a broken line indicates gradations of a target frame displayed in the case of no compensation, i.e., based on the mentioned frame data Di2.

In the case where number of gradations of a target frame increases as compared with a frame before the target frame by one frame as the change from j frame to (j+1) frame in FIG. 20(*a*), frame data Dj2 having been compensated by the mentioned gradation rate-of-change compensation amount Dv are (Di2+V1) as shown in FIG. 20(*b*). Whereas, in the case where number of gradations of a target frame decreases as compared with a frame before the target frame by one frame as the change from k frame to (k+1) frame, the frame data Dj2 having been compensated with the mentioned gradation rate-of-change compensation amount are (Di2−V2) as shown in FIG. 20(*b*).

Owing to the performance of the mentioned compensation, transmittance of a liquid crystal as for a display pixel (picture element), in which gradation of a target frame increases over the preceding frame by one frame, rises as compared with the case where a target frame is displayed based on a frame data Di2 before compensation. Whereas, transmittance of a liquid crystal as for a display pixel (picture element), in which a gradation of a target frame decreases below the preceding frame, drops as compared with the case where a target frame is displayed based on the frame data Di2 before compensation.

Thus, as for number of gradations of a target frame displayed by the display means 12, it comes to be possible to cause a display gradation (brightness) of display image to change substantially within one frame as shown in FIG. 20(*c*).

FIGS. 21(*a*), (*b*), (*c*), (*d*) and (*e*) are charts each showing change in gradation characteristic of display image at the display means 12 in the case where the vertical edge level signal Ve is not less than Ve4 ($Ve4 \leqq Ve$), or in the case where the first coefficient m=0, and the second coefficient n=1.

In the drawings, FIG. 21(*a*) indicates values of frame data Di2 before compensation. FIG. 21(*b*) indicates values of average gradation data Db (ave) to be outputted from the 1/2 coefficient unit 39 constituting the flicker suppression compensation amount output means 16. FIG. 21(*c*) indicates values of a flicker suppression compensation amount Df to be outputted from the flicker suppression compensation amount output means 16. FIG. 21(*d*) indicates values of frame data Dj2 obtained from compensating frame data Di2. FIG. 21(*e*) indicates gradations of a target frame to be displayed by the display means 12 based on the mentioned frame data Dj2. Further, in FIG. 21(*d*), a solid line indicates values of frame data Dj2, and for comparison, a broken line indicates values of frame data Di2 before compensation. Further, in FIG. 21(*f*), characteristic shown with the broken line indicates a display gradation in the case of carrying out no gradation compensation, or in the case where a target frame is displayed based on the mentioned frame data Di2.

As shown in FIG. 21(*a*), in the case of a flicker state in which number of gradations changes periodically every frame, a flicker suppression compensation amount Df as shown in FIG. 21(*c*) is outputted from the flicker suppression compensation amount output means 16. Then, frame data Di2 are compensated with this flicker suppression compensation amount Df. Accordingly, the frame data Di2 having been in the state that a flicker component is contained and variation in data values is significant as shown in FIG. 21(*a*), are compensated so that a data value in a region containing any flicker component in the frame data Di2 before compensation may be a constant data value like the frame data Dj2 shown in FIG. 21(*d*). Thus, in the case of displaying a target frame by the display means 12 based on the mentioned frame data Dj2, it becomes possible to prevent the flicker interference from being displayed.

In addition, in the case where the first coefficient m=0.5 and the second coefficient n=0.5, it is the same as FIG. 11 shown in the mentioned first embodiment.

Figure 22:
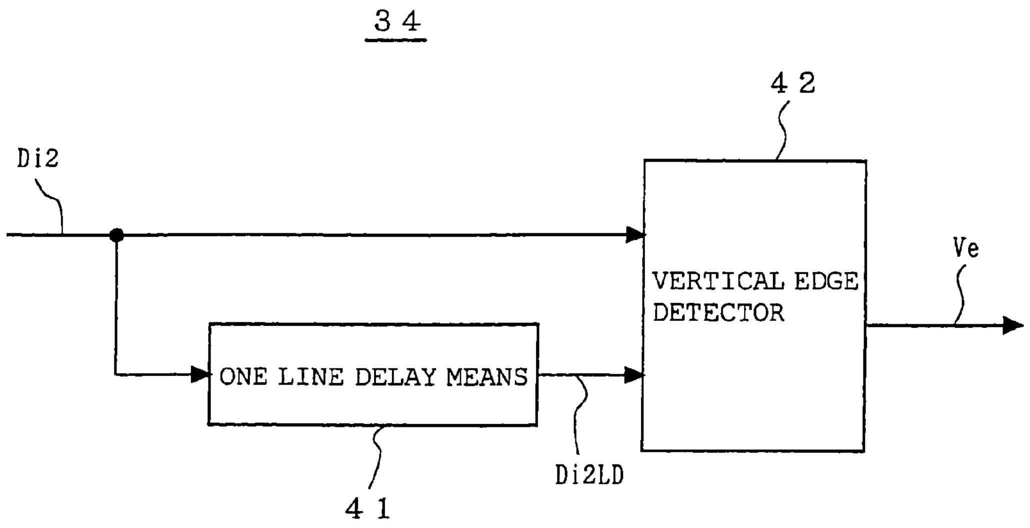
FIG. 22 is a diagram showing a constitution of vertical edge detection means according to the third embodiment.

FIG. 22 is a diagram showing an example of an internal constitution of the vertical edge detection means 34 of FIG. 16.

With reference to FIG. 22, one line delay means 41 outputs data Di2LD (hereinafter referred to as delay data Di2LD) obtained by delaying the frame data Di2 corresponding to a target frame by one horizontal scan time period. A vertical edge detector 42 outputs a vertical edge level signal Ve based on the mentioned frame data Di2 and the mentioned delay data Di2LD. This vertical edge level signal Ve is outputted, for example, in a manner of reference to a lookup table or a data processing based on the mentioned frame data Di2 and delay data Di2LD.

Hereinafter, a case where the mentioned vertical edge level signal Ve is outputted in a manner of data processing is described.

Figure 23:
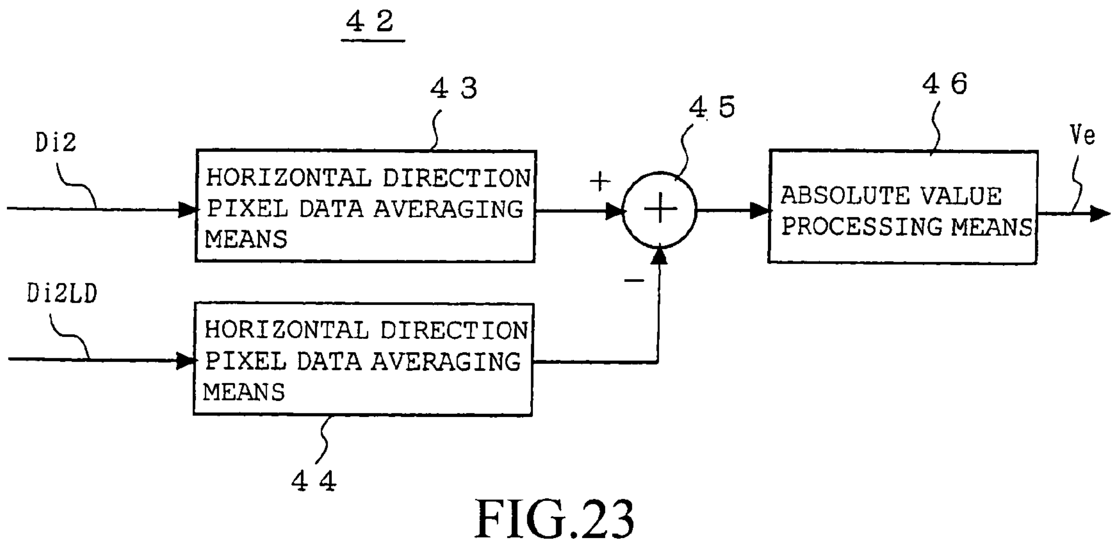
FIG. 23 is a diagram showing a constitution of a vertical edge detector according to the third embodiment.

FIG. 23 is an example of an internal constitution of the vertical edge detector 42 of FIG. 22 in the case where the mentioned vertical edge level signal Ve is outputted in a manner of the data processing. With reference to FIG. 23, the mentioned frame data Di2 and the mentioned delay data Di2LD are inputted to first horizontal direction pixel (picture element) data averaging means 43 and second horizontal direction pixel (picture element) data averaging means 44 respectively.

The first horizontal direction pixel (picture element) data averaging means 43, to which mentioned frame data Di2 is inputted, and the second horizontal direction pixel (picture element) data averaging means 44, to which mentioned delay data Di2LD is inputted, output to a subtracter 45 a first averaged data and second averaged data obtained by respectively averaging the mentioned frame data Di2 and delay data Di2LD each corresponding to continuous pixels (picture elements) on a horizontal line in the display means 12.

The subtracter 45, to which the mentioned first averaged data and second averaged data are inputted, subtracts the second averaged data from the first averaged data and outputs to absolute value processing means 46 a result of such subtraction.

An output signal from the absolute value processing means 46 is outputted, establishing magnitude of a difference between pixels (picture elements) for one line adjacent to each other in vertical direction as a signal Ve. Further, averaging, e.g., frame data Di2 corresponding to continuous pixels (picture elements) on a horizontal line in the display means 12 is carried out in order to eliminate influence due to noise or signal component contained in the mentioned frame data Di2, and to cause an appropriate vertical edge level signal Ve to output. Besides, it is matter of course that the number of pixels (picture elements) to be averaged varies depending on the system to which the mentioned vertical edge detection means is applied.

As described above, according to the image display device of this third embodiment, it becomes possible to adaptively compensate the mentioned frame data Di2 depending on whether or not any component equivalent to a vertical edge is contained in the frame data Di2 corresponding to a target frame.

Specifically, in the case where no component equivalent to the vertical edge is contained in the mentioned frame data Di2 and when number of gradations of the mentioned target frame is changed with respect to the frame before this target frame by one frame, then the mentioned frame data Di2 are compensated so that the change may be represented faster by the display means, thus the frame data Dj2 having been compensated are generated.

Consequently, by carrying out displaying of any target frame with the display means 12 based on the mentioned frame data Dj2, it becomes possible to improve rate-of-change in gradation of a display image at a normal drive voltage without change in drive voltage applied to the liquid crystal.

On the other hand, in the case where any component equivalent to the vertical edge is contained in the frame data Di2 and, besides, it is determined that the component equivalent to this vertical edge assuredly becomes a flicker interference in a target frame to be displayed by the display means, the frame data Di2 are compensated so that transmittance of the liquid crystal in the display means 12 may be an average gradation number of a flicker state, and a frame data Dj2 is generated. Thus, it comes to be possible to make display gradation constant in the case of displaying a target frame by the display means 12. Consequently, influence of the flicker interference on a displayed target frame can be suppressed.

Furthermore, in the case where any component equivalent to the vertical edge is contained in a frame data Di2 and, besides, the component equivalent to this vertical edge exerts any influence on image quality of a target frame to be displayed by the display means, a third compensation amount is generated based on a gradation rate-of-change compensation amount Dv and a flicker suppression compensation amount Df depending on degrees of the component equivalent to this vertical edge. Then, the mentioned frame data Di2 are compensated with this third compensation amount, thus frame data Dj2 are generated.

Consequently, in the case of displaying a target frame by the display means based on the mentioned frame data Dj2, as compared with the case of displaying a target frame based on the mentioned frame data Di2, it becomes possible to display at a normal drive voltage a frame in which occurrence of the flicker interference is suppressed and rate-of-change in gradation rate is improved.

Specifically, in the image display device according to this third embodiment, at the time of displaying any target frame by the display means, it comes to be possible to improve rate-of-change in display gradation, and prevent deterioration of image quality due to an unnecessary increase and decrease in number of gradations accompanied by, e.g., the occurrence of flicker interference.

Furthermore, the following effects like those in the foregoing first embodiment can be obtained. Specifically, by encoding a frame data Di2 corresponding to a target frame by the encoding means 4 and carrying out compression of data capacity, it becomes possible to reduce capacity of the memory necessary for delaying the mentioned frame data Di2 by one frame time period or two frame time period. Thus, it comes to be possible to simplify the delay means and to reduce circuit scale. Besides, since the encoding carries out the compression of data capacity without making the mentioned frame data Di2 thin, it is possible to enhance accuracy in frame data compensation amount Dc, and carry out appropriate compensation.

In addition, since encoding as to the frame data Di2 corresponding to a target frame to be displayed is not carried out, it becomes possible to display the mentioned target frame without exerting the influence of errors caused by coding and decoding.

Further, although the case where data, which are inputted to the gradation rate-of-change compensation amount output means 15, are of 8 bits in the above-mentioned descriptions of the operation, it is not limited to this example. But it is also preferable to be of any number of bits only on condition that the data are of bits enabling to substantially generate compensation data by, e.g., an interpolation processing.

Embodiment 4

In the liquid crystal panel of the display means 12 described in the foregoing third embodiment, for example, a response rate at the time of changing from any intermediate gradation (gray) to a high gradation (white) is slow. According to this fourth preferred embodiment, in the liquid crystal panel, the mentioned slow response rate, which is a problem at the time of such change, is taken into consideration, and an internal constitution of the vertical edge detector 42 according to the mentioned third embodiment is improved.

Figure 24:
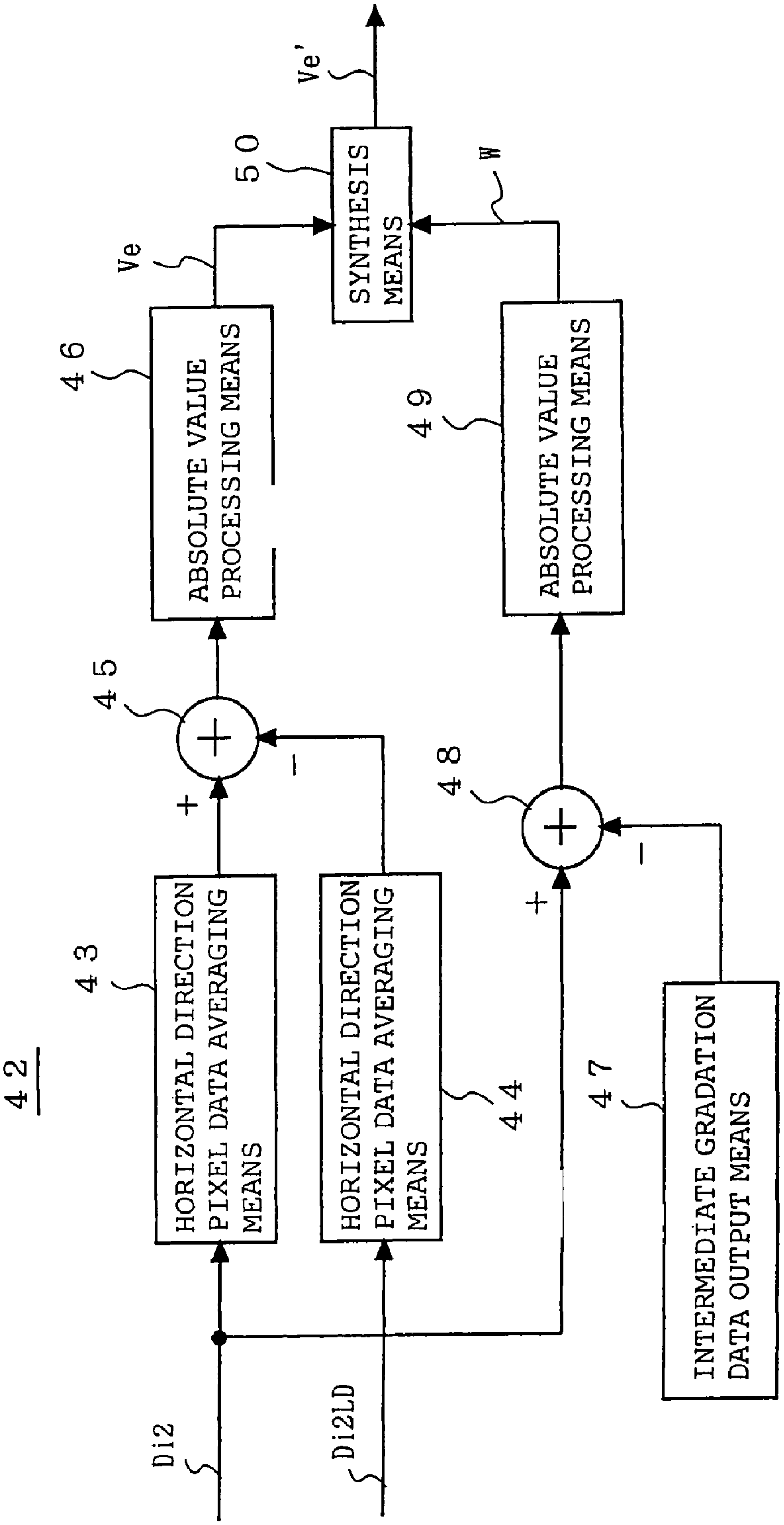
FIG. 24 is a diagram showing a constitution of a vertical edge detector according to a fourth preferred embodiment.

FIG. 24 is an example of an internal constitution of a vertical edge detector 42 according to this fourth embodiment.

In this connection, except for the internal constitution of this vertical edge detector 42 shown in FIG. 24, the other constituting elements and operations are the same as in the foregoing third embodiment so that repeated descriptions thereof are omitted.

Frame data Di2 are inputted to a first horizontal direction pixel (picture element) data averaging means 43 and a subtracter 48. Besides, ½ gradation data are outputted to the subtracter 48 from halftone (intermediate gradation) data output means 47. Further, the mentioned ½ gradation data are the ones corresponding to ½ gradations of the maximum number of gradations within a range capable of being displayed by the display means. Accordingly, for example, in the case of an 8-bit gradation signal, 127 gradation data are outputted from the mentioned ½ gradation data output means.

The subtracter 48, to which a frame data Di2 and a ½ gradation data are inputted, subtracts the ½ gradation data from the mentioned frame data Di2, and outputs differential data obtained by the mentioned subtraction to absolute value processing means 49.

The absolute value processing means 49, to which mentioned differential data are inputted, takes an absolute value of the mentioned differential data, and outputs it to synthesis means 50 (hereinafter, the mentioned differential data having been converted to an absolute value is referred to as a target frame gradation number signal w). In addition, a target frame gradation number signal w represents how number of gradations of the target frame is apart from the ½ gradation.

The synthesis means 50 outputs a new vertical edge level signal Ve' based on a vertical edge level signal Ve, which is outputted from the mentioned first absolute value processing means 46, and a target frame gradation number signal w, which is outputted from mentioned second absolute value processing means 49. Then, coefficient means 37 outputs a first coefficient m and a second coefficient n in accordance with the new vertical edge level signal Ve'.

Herein, a new vertical edge level signal Ve' is obtained by addition or multiplication of the mentioned vertical edge level signal Ve and the mentioned target frame gradation number signal w. Alternatively, it is preferable to obtain a new vertical edge level signal Ve' by multiplying either the mentioned vertical edge level signal Ve or the mentioned target frame gradation number signal w by a coefficient, then adding these signals.

With the vertical edge detection means according to this fourth embodiment, as number of gradations of a target frame is remote from ½ gradations (for example, 127 gradations in the case of an 8-bit gradation signal), a value of the mentioned second coefficient n becomes larger. Accordingly, a portion of a flicker suppression compensation amount Df comes to be larger in a compensation amount Dc. In other words, the mentioned new vertical edge detection signal Ve' can be said a signal obtained by weighting the mentioned vertical edge level signal Ve in accordance with number of gradations of a target frame with the mentioned target frame gradation number signal w.

Hereinafter, weight of the mentioned new vertical edge level signal Ve' in accordance with number of gradations of a target frame is described with examples shown in FIG. 25. In addition, FIG. 25 shows an example of the case of adding the vertical edge level signal Ve and the target frame gradation number signal w.

Figure 25:
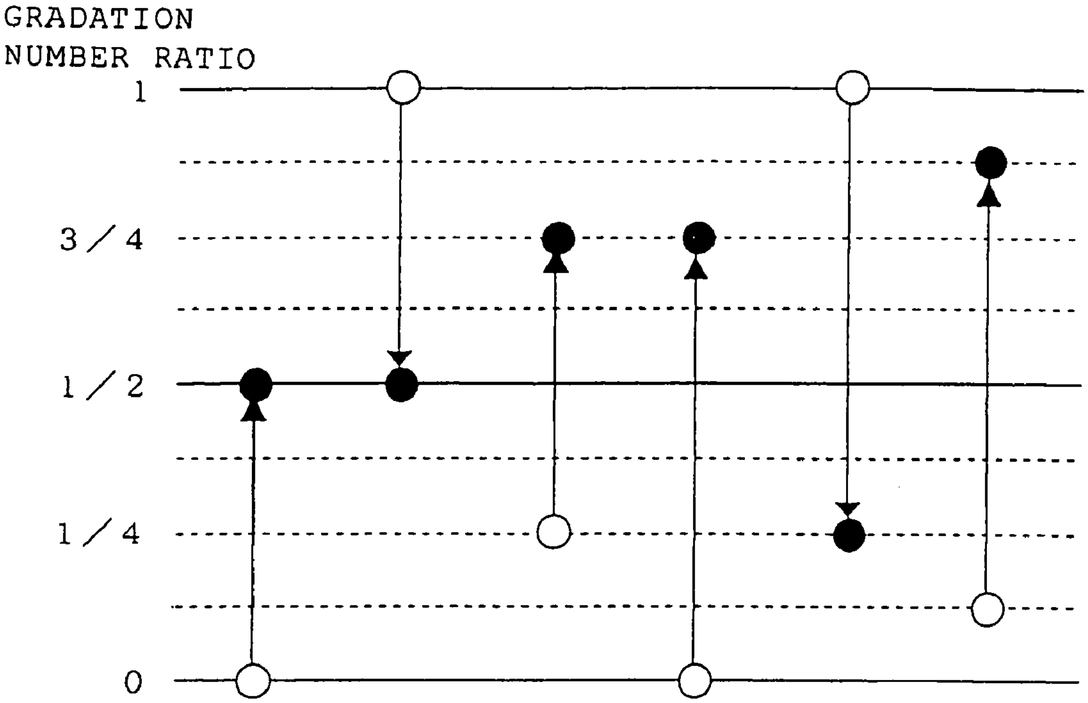
FIG. 25 is a chart for explaining a new vertical edge level signal Ve'.

With reference to FIG. 25, a black circle denotes number of gradations of a target frame, and a white circle denotes number of gradations of the frame before the mentioned target frame by one frame. In the drawing, arrows ①, ②, ③ shows a case where the mentioned vertical edge level signal Ve is ½, and arrows ④, ⑤, ⑥ are in the case where the mentioned vertical edge level signal Ve is ¾. In addition, a vertical axis of the chart is shown with a ratio of number of gradations. Specifically, numeral 1 corresponds to the maximum value of number of gradations capable of being displayed by the display means (for example, 255 gradations in the case of an 8-bit gradation signal). Numeral 0 corresponds to the minimum value (for example, 0 gradation in the case of an 8-bit gradation signal).

Described first is the case where the mentioned vertical edge level signal Ve is ½ as indicated by the arrows ①, ②, ③ in the chart. As shown in FIG. 25, in the case where ratio of number of gradations is changed from 0 or 1 to ½ ①, or ②), a value obtained by subtracting the ½ gradation from the number of gradation of a target frame, i.e., the mentioned target frame gradation number signal w becomes 0. On the other hand, in the case where ratio of number of gradations is changed from ¼ to ¾(③), the mentioned target frame gradation number signal w becomes ¼. Accordingly, a new vertical edge level signal Ve', which is outputted from the synthesis means 50, becomes larger in value in the case of ③ where a target frame is remote from the ½ gradation as shown in a table of the chart.

Described now is the case where the mentioned vertical edge level signal Ve is ¾ indicated by the arrows ④, ⑤, ⑥ in the chart. As shown in FIG. 25, in the case where ratio of number of gradations is changed from 0 to ¾, or from 1 to ¼(④, or ⑤), a value obtained by subtracting the ½ gradation from the number of gradation of a target frame, i.e., the mentioned target frame gradation number signal w becomes ¼ respectively. On the other hand, in the case where ratio of number of gradations is changed from ⅛ to ⅞(⑥), the mentioned target frame gradation number signal w becomes ¾. Accordingly, a new vertical edge level signal Ve', which is outputted from the synthesis means 50, becomes larger in value in the case of ⑥ where a target frame is remote from the ½ gradation as shown in the table of the chart.

As described above, by applying the vertical edge detector according to this fourth embodiment to the image display device described in the foregoing third embodiment, it comes to be possible to weight a vertical edge detection signal Ve. Accordingly, even in the case where change in number of gradations of a target frame and the frame before this target frame by one frame are the same, different values of the first coefficient m and second coefficient n are outputted. In this manner, it comes to be possible to adjust a portion of a flicker suppression compensation amount in a compensation amount Dc, which is outputted from the frame data compensation amount output device 35, in accordance with number of gradations of the mentioned target frame. Consequently, it becomes possible to adaptively output the mentioned compensation amount Dc depending on a response rate of a change in gradation at a target frame and degrees of the flicker interference.

Further, although a ½ gradation is described as an example of halftone in this fourth embodiment, weighting with respect to the mentioned arbitrary gradation can be carried out by outputting data corresponding to an arbitrary gradation from halftone data output means without taking the ½ gradation.

In addition, it is possible to combine what are described in the foregoing first to fourth embodiments when required. For example, it is possible to add the vertical edge detection means, which is described in the foregoing third or fourth embodiment, to the image display device described in the first embodiment.

Furthermore, a liquid panel is employed as an example in the foregoing first to fourth embodiments. However, it is also possible to apply the frame data compensation amount output device, the vertical edge detection device and the like, which are described in the foregoing first to fourth embodiments, to a device in which image displaying is carried by causing any substance having a predetermined moment of inertia to move like the liquid crystal, for example, an electronic paper.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. A frame data compensation amount output device taking one frame for a target frame out of frames contained in an image signal to be inputted, the frame data compensation amount output device comprising:

first compensation amount output means for outputting a first compensation amount to compensate data corresponding to said target frame based on the data corresponding to said target frame and the data corresponding to a frame before said target frame by one frame; and second compensation amount output means for outputting a second compensation amount to compensate a specific data detected based on the data corresponding to said target frame and the data corresponding to a frame before said target frame by one frame;

a third compensation amount that is generated based on said first compensation amount and said second compensation amount and compensates data corresponding to said target frame;

flicker interference detection means that detects flicker interference based on the data corresponding to said target frame and the data corresponding to a frame before said target frame by one frame, wherein the frame data compensation amount output device outputs any of said first compensation amount, said second compensation amount and a third compensation amount that is generated based on said first compensation amount and said second compensation amount and compensates data corresponding to degree of said flicker interference included in said target frame.

2. The frame data compensation amount output device according to claim 1, wherein said first compensation amount output means is preliminarily provided with a data table consisting of compensation amount to compensate data corresponding to the target frame, and said first compensation amount output means outputs a compensation amount to compensate data corresponding to said target frame as a first compensation amount from the data table based on the data corresponding to said target frame and the data corresponding to a frame before said target frame by one frame.

3. The frame data compensation amount output device according to claim 1, wherein said first compensation amount output means outputs a compensation amount to compensate data corresponding to number of gradations of said target frame as a first compensation amount.

4. The frame data compensation amount output device according to claim 1, wherein said second compensation amount output means is preliminarily provided with a data table consisting of compensation amount to compensate specific data detected based on the data corresponding to said target frame and the data corresponding to a frame before said target frame by one frame, and outputs a compensation amount to compensate data corresponding to said specific data as a second compensation amount from said data table.

5. The frame data compensation amount output device according to claim 1, wherein said second compensation amount is a compensation amount to compensate data corresponding to number of gradations out of the specific data detected based on the data corresponding to said target frame and the data corresponding to a frame before said target frame by one frame.

6. The frame data compensation amount output device according to claim 1, further comprising recording means for recording data corresponding to a frame contained in an image signal to be inputted.

7. The frame data compensation amount output device according to claim 1, further comprising encoding means for encoding data corresponding to a frame contained in an image signal to be inputted.

8. The frame data compensation amount output device according to claim 7, further comprising decoding means for decoding data corresponding to a frame encoded by the encoding means.

9. A frame data compensation device comprising the frame data compensation amount output device as defined in claim 1;

wherein the frame data compensation device outputs any of said first compensation amount, said second compensation amount and a third compensation amount that is generated based on said first compensation amount and said second compensation amount and compensates data corresponding to said target frame, said first compensation amount, said second compensation amount and a third compensation amount being outputted from said frame data compensation amount output device.

10. A frame data compensation amount output device comprising:

a vertical edge detection device taking one frame for a target frame out of frames consisting of plural horizontal lines in an image signal to be inputted, and including: first horizontal direction pixel data averaging means that outputs first averaged data obtained by averaging data corresponding to continuous pixels on a horizontal line of said target frame; and second horizontal direction pixel data averaging means that outputs second averaged data obtained by averaging data corresponding to continuous pixels on a horizontal line before said horizontal line of said target frame by one horizontal scan time period; wherein a vertical edge in said target frame is detected based on said first averaged data outputted from said first horizontal direction pixel data averaging means and said second averaged data outputted from said second horizontal direction pixel data averaging means;

a vertical edge level signal output device including the vertical edge detection device as defined above, wherein a vertical edge level signal detected by said vertical edge detection device is outputted;

means for outputting a first compensation amount to compensate data corresponding to said target frame based on the data corresponding to said target frame and the data corresponding to a frame before said target frame by one frame; and means for outputting a second compensation amount to compensate data corresponding to a vertical edge in said target frame based on the data corresponding to said target frame and the data corresponding to a frame before said target frame by one frame wherein the frame data compensation amount output device outputs, corresponding to a vertical edge detection signal outputted from said vertical edge detection signal output device, any of said first compensation amount, said second compensation amount and a third compensation amount that is generated based on said first compensation amount and said second compensation amount and compensates data corresponding to said target frame.

11. The frame data compensation amount output device according to claim 10, wherein said vertical edge level signal output device includes gradation number signal output means for outputting a target frame gradation number signal base on halftone data corresponding to halftone of number of gradations within a range capable of being displayed by display means in accordance with an image signal to be inputted, and data corresponding to number of gradations of the target frame; and a vertical edge level signal is outputted based on first averaged data, second averaged data and a signal of number of gradations of said target frame outputted from said gradation number signal output means.

12. The frame data compensation amount output device according to claim 10, wherein said first compensation amount output means is preliminarily provided with a data table consisting of compensation amount to compensate data corresponding to the target frame, and said first compensation amount output means outputs a compensation amount to compensate data corresponding to said target frame as a first compensation amount from the data table based on the data corresponding to said target frame and the data corresponding to a frame before said target frame by one frame.

13. The frame data compensation amount output device according to claim 10, wherein said first compensation amount output means outputs a compensation amount to compensate data corresponding to number of gradations of said target frame as a first compensation amount.

14. The frame data compensation amount output device according to claim 10, wherein said second compensation amount output means is preliminarily provided with a data table consisting of compensation amount to compensate data corresponding to a vertical edge in the target frame, and outputs a compensation amount to compensate said specific data as a second compensation amount from said data table based on the data corresponding to said target frame and the data corresponding to a frame before said target frame by one frame.

15. The frame data compensation amount output device according to claim 10, wherein said second compensation amount is a compensation amount to compensate data corresponding to number of gradations out of the data corresponding to the vertical edge in the target frame.

16. A frame data compensation device comprising the frame data compensation amount output device as defined in claim 10;

wherein the frame data compensation device outputs any of said first compensation amount, said second compensation amount and a third compensation amount that is generated based on said first compensation amount and said second compensation amount and compensates data corresponding to said target frame, said first compensation amount, said second compensation amount and a third compensation amount being outputted from said frame data compensation amount output device.

17. A frame data display device comprising the frame data compensation device as defined in claim 10, wherein a target frame that has been compensated by said frame data compensation device is displayed based on data corresponding to the target frame compensated by said frame date compensation device.

18. A frame data compensation amount output method taking one frame for a target frame out of frames contained in an image signal to be inputted, comprising:

obtaining a first compensation amount compensating data corresponding to said target frame based on the data corresponding to said target frame and the data corresponding to a frame before said target frame by one frame;

obtaining a second compensation amount compensating said specific data detected based on the data corresponding to said target frame and the data corresponding to a frame before said target frame by one frame; and obtaining a third compensation amount being generated based on said first compensation amount and said second compensation amount and compensating data corresponding to said target frame; and obtaining flicker interference data detected based on data corresponding to said target frame and the data corresponding to a frame before said target frame by one frame, wherein any of a first compensation amount, a second compensation amount and a third compensation amount is outputted corresponding to specific data and a degree of detected flicker interference.

19. A frame data compensation method, wherein data corresponding to a target frame are compensated based on any of a first compensation amount, a second compensation amount and a third compensation amount outputted by the frame data compensation amount output method as defined in claim 18.

* * * * *